United States Patent
Gobburu et al.

(10) Patent No.: US 6,736,322 B2
(45) Date of Patent: May 18, 2004

(54) METHOD AND APPARATUS FOR ACQUIRING, MAINTAINING, AND USING INFORMATION TO BE COMMUNICATED IN BAR CODE FORM WITH A MOBILE COMMUNICATIONS DEVICE

(75) Inventors: Venkata T. Gobburu, San Jose, CA (US); Krishnakumar Narayanan, Cupertino, CA (US); Nagesh Challa, Saratoga, CA (US); Michel E. Gannage, Los Altos, CA (US)

(73) Assignee: ecrio inc., Cupertino, CA (US)

( * ) Notice: Subject to any disclaimer, the term of this patent is extended or adjusted under 35 U.S.C. 154(b) by 339 days.

(21) Appl. No.: 09/996,847

(22) Filed: Nov. 19, 2001

(65) Prior Publication Data

US 2002/0060246 A1 May 23, 2002

Related U.S. Application Data

(60) Provisional application No. 60/313,753, filed on Aug. 20, 2001, provisional application No. 60/252,101, filed on Nov. 21, 2000, and provisional application No. 60/252,346, filed on Nov. 20, 2000.

(51) Int. Cl.$^7$ ................................................. G06K 7/10
(52) U.S. Cl. .............................. 235/462.46; 235/462.01
(58) Field of Search ....................... 235/462.01–462.48, 235/472.01, 472.02, 472.03, 375, 380, 382, 383

(56) References Cited

U.S. PATENT DOCUMENTS

| | | | |
|---|---|---|---|
| 3,993,861 A | 11/1976 | Baer | 178/5.6 |
| 4,329,684 A | 5/1982 | Monteath et al. | 340/707 |
| 4,613,904 A | 9/1986 | Lurie | 358/142 |
| 4,736,096 A | 4/1988 | Ushikubo | 235/472 |

(List continued on next page.)

FOREIGN PATENT DOCUMENTS

WO    WO 00/03328    1/2000

OTHER PUBLICATIONS

H.R. Damon Gonzalez, Jr., Ronald J. Brown, and Lawrence Faulkner; Creating An End–to–End Digital Payment System, Oct. 15, 1999, 17 pages.

Mastercard International Incorporated, Mobile Commerce, http://www.mastercardintl.com/newtechnology/mcommerce/whatis/payment.html: printed Oct. 10, 2001.

The International Engineering Consortium: Wireless Short Message Service (SMS): http://www.iec.org:printed Nov. 8, 2001; 19 pages.

Michael Meehan; Sabre rolling out wireless check–in system for air travelers; file://c:\Law Practice Clients\ecrio\A1132US0V . . .\01199NAV47_STO5263000.htm; printed Nov. 21, 2000; 3 pages.

Betsy Wade; Air Tickets Shred a Barrier; http://www.nytimes.com/2000/11/19/technology/19PRAC.html?printpage=yes; printed Nov. 18, 2000; 5 pages.

(List continued on next page.)

Primary Examiner—Thien M. Le
(74) Attorney, Agent, or Firm—Altera Law Group, LLC

(57) ABSTRACT

A user is provided with a secure database containing information in diverse categories that relates to the user and that may be represented at least in part in bar code form and communicated with light from a mobile communications device. The diverse information is obtained from any combination of a variety of vendor and governmental computer systems, internet service providers, and communications devices. The user has access to the database using a mobile communications device for displaying, managing, and entering information, and for communicating information in bar code form with light. The user first selects the category that contains the specific item of information, and then selects the specific item of information. The specific item of information then is communicated in bar code form with light from the mobile communications device for scanning by a bar code scanner to obtain the desired good or service.

147 Claims, 16 Drawing Sheets

U.S. PATENT DOCUMENTS

| | | | |
|---|---|---|---|
| 4,879,540 A | 11/1989 | Ushikubo | 235/385 |
| 4,990,756 A | 2/1991 | Hoemann | 235/462 |
| 4,999,617 A | 3/1991 | Uemura et al. | 340/706 |
| 5,468,946 A | 11/1995 | Oliver | 235/462 |
| 5,488,571 A | 1/1996 | Jacobs et al. | 364/705.07 |
| 5,523,794 A | 6/1996 | Mankovitz et al. | 348/460 |
| 5,570,297 A | 10/1996 | Brzezinski et al. | 364/514 R |
| 5,640,002 A | 6/1997 | Ruppert et al. | 235/472 |
| 5,760,383 A | 6/1998 | Heske, III | 235/462 |
| 5,773,954 A | 6/1998 | VanHorn | |
| 5,821,512 A | 10/1998 | O'Hagan et al. | |
| 5,832,457 A | 11/1998 | O'Brien et al. | |
| 5,850,304 A | 12/1998 | Elmers et al. | 359/142 |
| 5,857,079 A | 1/1999 | Claus et al. | |
| 5,880,769 A | 3/1999 | Nemirofsky et al. | 348/12 |
| 5,918,211 A | 6/1999 | Sloane | |
| 5,923,735 A | 7/1999 | Swartz et al. | |
| 5,953,047 A | 9/1999 | Nemirofsky | 348/13 |
| 5,979,757 A | 11/1999 | Tracy et al. | |
| 6,014,374 A | 1/2000 | Paneth et al. | 710/73 |
| 6,015,089 A * | 1/2000 | Hecht et al. | 235/462.16 |
| 6,070,793 A * | 6/2000 | Reichl et al. | 235/375 |
| 6,075,971 A | 6/2000 | Williams et al. | |
| 6,082,620 A | 7/2000 | Bone, Jr. | 235/462.16 |
| 6,101,483 A | 8/2000 | Petrovich et al. | |
| 6,119,943 A | 9/2000 | Christy | 235/468 |
| 6,123,259 A | 9/2000 | Ogasawara | |
| 6,129,274 A | 10/2000 | Suzuki | |
| 6,129,276 A | 10/2000 | Jelen et al. | |
| 6,138,911 A | 10/2000 | Fredregill et al. | |
| 6,179,206 B1 * | 1/2001 | Matsumori | 235/383 |
| 6,281,820 B1 | 8/2001 | Fields | 341/137 |
| 6,336,587 B1 * | 1/2002 | He et al. | 235/462.45 |
| 6,394,354 B1 * | 5/2002 | Wilz et al. | 235/472.01 |
| 6,472,805 B1 * | 10/2002 | Nakagawa et al. | 313/402 |
| 2002/0022963 A1 | 2/2002 | Miller et al. | |
| 2002/0030105 A1 | 3/2002 | Miller et al. | |
| 2002/0042722 A1 * | 4/2002 | Tsuji et al. | 705/1 |
| 2002/0059146 A1 * | 5/2002 | Keech | 705/64 |
| 2002/0063150 A1 * | 5/2002 | Nygren et al. | 235/375 |
| 2002/0198777 A1 * | 12/2002 | Yuasa | 705/14 |
| 2003/0088442 A1 * | 5/2003 | Michael et al. | 705/3 |
| 2003/0104820 A1 * | 6/2003 | Greene et al. | 455/456 |

OTHER PUBLICATIONS

Aeritas Inc, New Wireless Check–In and Security Solution for Travel—Aeritas Freedom Pass™ [online], [retrieved on Feb. 5, 2002] Retrieved from the Internet <URL:http://www.aeritas.com/>.

Aeritas Inc., Aeritas Solutions—Overview [on–line], [retrieved on Feb. 5, 2002]. Retrieved from the Internet <URL:http//www.aeritas.com/aeritas.jsp?function=solutions&sub=overview>.

Aeritas Inc., Aeritas Solutions—Platform [on–line], [retrieved on Feb. 5, 2002], Retrieved from the Internet <URL: http//www.aeritas.com/aeritas.jsp?function=solutions&sub=platform>.

Aeritas Inc., Electronic Barcode Solution Works with Various Wireless Devices [on–line], [retrieved on Feb. 5, 2002]. Retrieved from the Internet <URL: http//www.aeritas.com/aeritas.jsp?function=solutions&sub=barcode>.

Aeritas Inc., New Fast–Track Wireless Check–In and Security Solution [on–line], [retrieved on Feb. 5, 2002]. Retrieved from the Internet <URL: http//www.aeritas.com/aeritas.jsp?function=solutions&sub=travel>.

Aeritas Inc., New Fast–Track Wireless Check–In and Security Solution [on–line], [retrieved on Feb. 5, 2002]. Retrieved from the Internet ¢URL: http//www.aeritas.com/aeritas.jsp?function=solutions&sub=travel&p=2>.

Aeritas Inc., Aeritas Solutions—Aeritas Aer Wallet [on–line], [retrieved on Feb. 5, 2002]. Retrieved from the Internet >URL:http//www.aeritas.com/aeritas.jsp?function=solutions&sub=voice>.

Aeritas Inc., Aeritas Custom Solutions—Incorporate Aeritas FreedomPass™ Line–Busting Technology for Your Customers Today [on–line], [retrieved on Feb. 5, 2002]. Retrieved from the Internet <URL: http//www.aeritas.com/aeritas.jsp-?function=solutions&sub=custom>.

Aeritas Inc., Company—Aeritas, Inc.[on–line], [retrieved on Feb. 5, 2002]. Retrieved from the Internet <URL http//www.aeritas.com/aeritas.jsp?function=company&sub=aeritasinc>.

Aeritas Inc., Company—Contact Us[on–line], [retrieved on Feb. 5, 2002]. Retrieved from the Internet <URL:http//www.aeritas.com/aeritas.jsp?function=solutions&sub=contact>.

Aeritas Inc., Press Releases—Welcome to the Aeritas media Room [on–line], [retrieved on Feb. 5, 2002]. Retrieved from the Internet <URL:http://www.aeritas.com/aeritas.jsp?function=press&sub=news>. et seq.

Aeritas Inc., Press—Aeritas–Related Press Articles [on–line], [retrieved on Feb. 5, 2002]. Retrieved from the Internet <URL; http//www.aeritas.com/aeritas.jsp?function=press&sub=articles>.

Conlon, Michael, Reuters.com Away on Business: Electronic Security, Nov. 22, 2001 [on–line], Retrieved from the Internet <URL: http//www.aeritas.com/includes/press/reuters–11–22–01.htm>.

Goldstein, Alan, The Dallas Morning News. Stalled at the Gate, Firm checks in New Plan, Nov. 14, 2001 [online] [retrieved on Feb. 5, 2002]. Retrieved from the Internet <URL:http://www.aeritas.com/includes/press/dmn1114.htm>.

Wireless Developer Network News. Two Entrepreneurs Flying High on Sep. 111, Nov. 14, 2001 [online], [retrieved on Feb. 5, 2002]. Retrieved from the Internet <URL:http://www.aeritas.com/includes/press/devnet1114htm>.

M–Travel.com. Aeritas Launches Secure Wireless Check–In With Barcode, Nov. 9, 2001 [online], [retrieved on Feb. 5, 2002]. Retrieved from the Internet <URL:http://www.aeritas.com/includes/press/mtravel 1109.htm>.

Europe News. FreedomPass™ Provides Increased Security and Reduces Airport Congestion, Nov. 8, 2001 [online], [retrieved on Feb. 5, 2002]. Retrieved from the Internet <URL:http://www.aeritas.com/includes/euronews 1108.htm>.

M Business Daily. Aeritas launches Wireless Check–In and Security Service, Nov. 8, 2001 [online], [retrieved on Feb. 5, 2002]. Retrieved from the Internet <URL:http://www.aeritas.com/includes/press/mbd1 108.htm>.

Smith, Brad. Wireless Week.com. Resuming Mobility—Airlines Cautiously Reinstate Wireless Check–In, Oct. 29, 2001 [online], [retrieved on Feb. 5, 2002]. Retrieved from the Internet <URL:http://www.aeritas.com/includes/press/wwc1029.htm>.

Closser, Stacey. Dallas–Fort Worth TechBiz. Airport Security Reinforces Need for Company's Wireless Check–In App, Oct. 22, 2001 [online], [retrieved on Feb. 5, 2002]. Retrieved from the Internet <URL:http://www.aeritas.com/includes/press/dfwb10101.htm>.

Hobica, G. & Liang, K. Mobile Computing & Communications. Now Boarding: All Phones, [online], [retrieved on Feb. 5, 2002]. Retrieved from the Internet <URL:http://www.aeritas.com/includes/press/mobilecomputing.html>.

WirelessWeek.com. Site of the Week—Aeritas Inc., Jul. 23, 2001 [online], [retrieved on Feb. 5, 2002]. Retrieved from the Internet <URL:http://www.aeritas.com/includes/press/WirelessWeek_com.htm>.

Johnston, David C., The New York Times. Travel Advisory—New Cell Phone Trick: It's a Boarding Pass, Jul. 22, 2001 [online], [retrieved on Feb. 5, 2002]. Retrieved from the Internet <URL:http://www.aeritas.com/includes/press/nytimes.htm>.

Speech Technology Magazine. News & Views—Siemens Business Services, Aeritas Announce Partnership, May/Jun. 2001 [online], [retrieved on Feb. 5, 2002]. Retrieved from the Internet <URL:http://www.aeritas.com/includes/press/speech.htm>.

Muraskin, Ellen. Communications Convergence.com. Speaking Tour: ASR and TTS Follow the Money—Planes, Train, Bar Codes, and Voice Verification, Jun. 5, 2001 [online], [retrieved on Feb. 5, 2002]. Retrieved from the Internet <URL:http://www.aeritas.com/includes/press/convergence.htm>.

Bounds, Jeff. Dallas Business Journal. Region Travels to Front in Reservations, Jun. 1, 2001 [online], [retrieved on Feb. 5, 2002]. Retrieved from the Internet <URL:http://www.aeritas.com/includes/press/dallas_business.htm>.

Gawticki, Scott M. Telecom Click. Wireless Apps Get Real, Jun. 1, 2001 [online], [retrieved on Feb. 5, 2002]. Retrieved from the Internet <URL:http://www.aeritas.com/includes/press/telecomclick.htm>.

Hastings, Nick. Dow Jones Newswires. From the Floor: An Italian Job, May 30, 2001 [online], [retrieved on Feb. 5, 2002]. Retrieved from the Internet <URL:http://www.aeritas.com/includes/press/Dow%20Jones%20Interactive.htm>.

Bray, Roger. Financial Times FT.com. Inside Track: Lufthansa Plans Check–In by Wap, May 29, 2001 [online], [retrieved on Feb. 5, 2002]. Retrieved from the Internet <URL:http://www.aeritas.com/includes/press/financial_times.htm>.

Flachi, Jerome. CommWeb.com. Lufthansa Debuts Barcode Check–In and Boarding, May 25, 2001 [online], [retrieved on Feb. 5, 2002]. Retrieved from the Internet <URL:http://www.aeritas.com/includes/press/Lufthansa.htm>.

Worldroom Travel Digest. Lufthansa Launches Mobile Check–In, May 25, 2001 [online], [retrieved on Feb. 5, 2002]. Retrieved from the Internet <URL:http://www.aeritas.com/includes/press/worldroom.htm>.

McDonough, Brian. Wireless Newsfactor. Wireless Connections Let Lufthansa Customers Board on the Fly, May 24, 2001 [online], [retrieved on Feb. 5, 2002]. Retrieved from the Internet <URL:http://www.aeritas.com/includes/press/wireless_news2.htm>.

Aviation Daily. Lufthansa Inks Check–In Deal, May 24, 2001 [online], [retrieved on Feb. 5, 2002]. Retrieved from the Internet <URL:http://www.aeritas.com/includes/press/aviation files/channel_ebiz.html>.

Eye For Travel.com, Lufthansa m–Barqs On Wireless Check–In Project, May 23, 2001 [on–line], [retrieved on Feb. 5, 2002]. Retrieved from the Internet <URL:http//www.aeritas.com/includes/press/eye_travel.htm>.

Mobileinfo.com, Lufthansa Uses Mobile Devices As Digital Boarding Pass, May 22, 2001 [on–line], [retrieved on Feb. 5, 2002]. Retrieved from the Internet <URL:http//www.aeritas.com/includes/press/mobile_info.htm>.

Closser, Stacey. Dallas–Forth Worth TechBiz, Airline Boarding Passes Made Wireless, May 22, 2001 [on–line], [retrieved on Feb. 5, 2002]. Retrieved from the Internet <URL:http//www.aeritas.com/includes/press/dfw_techbiz_052201.htm>.

Turek, Norbert. Informationweek.com News, WAP Apps Make Their Way To Biz–Critical Services, Mar. 19, 2001 [on–line], [retrieved on Feb. 5, 2002]. Retrieved from the Internet <URL:http//www.aeritas.com/includes/press/information.htm>.

Houch, J. B. Wireless Newfactor, Have PDA? Will Travel, Mar. 16, 2001 [on–line], [retrieved on Feb. 5, 2002]. Retrieved from the Internet <URL:http//www.aeritas.com/includes/press/wireless_news.htm>.

Carter, Wayne. Dallas Localbusiness.com, Aeritas wants to bring mobile commerce customes on board, Mar. 15, 2001 [on–line], [retrieved on Feb. 5, 2002]. Retrieved from the Internet <URL: http//www.aeritas.com/includes/press/localbusiness.htm>.

Klitsgaard, Neils. Global Bluetooth Tracking, newsletter, Mar. 14, 2001 [on–line], [retrieved on Feb. 5, 2002]. Retrieved from the Internet <URL:http//www.aeritas.com/includes/press/bluetags_files/Newsletter1.asp>.

Global Wireless, Siemens Teams up for m–commerce travel service, Mar. 2, 2001 [on–line], [retrieved on Feb. 5, 2002]. Retrieved from the Internet <URL: http//www.aeritas.com/includes/press/global_news.htm>.

Boyter, Scott. Dallas–Forth Worth TechBiz, Aeritas signs deal with Siemens for European travel application, Mar. 2, 2001 [on–line], [retrieved on Feb. 5, 2002]. Retrieved from the Internet <URL:http//www.aeritas.com/includes/press/DFWTB–3–2–01.htm>.

Conlon, Michael. Reuters Technology, Away on Business: With the Wave of a Phone, Feb. 24, 2001 [on–line], [retrieved on Feb. 5, 2002]. Retrieved from the Internet <URL:http//www.aeritas.com/includes/press/SVNews2–24–2001.htm>.

Boyter, Scott. Dallas–Forth Worth TechBiz, Aeritas tries to fill void until 3G wireless is ready; Mobile boarding pass is just one application being tested, Feb. 19, 2001 [on–line], [retrieved on Feb. 5, 2002]. Retrieved from the Internet <URL:http//www.aeritas.com/includes/press/DFWTechBiz.htm>.

Alan Goldstein. DallasNews.com, the Dallas Morning News, Impulsity a new voice in mobile commerce; Dec. 27, 2000, [on–line], [retrieved on Feb. 5, 2002]. Retrieved from the Internet <URL:http//www.aeritas.com/includes/press/DMN–AG.htm>.

Peterson, A. & Harris, N. The Wall Street Journal, WSJ.com, Wireless Web's Vast Promises Have So Far Been Unkept in U.S., Dec. 1, 2000 [on–line], [retrieved on Feb. 5, 2002]. Retrieved from the Internet <URL:http//www.aeritas.com/includes/press/wsj.htm>.

Goldstein, A. & Bajaj, V. The Dallas Morning News, DallasNews.com, Rush toward Wireless devices collides with reality of what they deliver, by Alan Goldstein, Nov. 30, 2000 [on–line], [retrieved on Feb. 5, 2002]. Retrieved from the Internet <URL:http//www.aeritas.com/includes/press/DallasMorningNews.htm>.

Meehan, Michael. Computerworld, Sabre Rolling out wireless check–in system for air travelers, Oct. 20, 2000 [on–line], [retrieved on Feb. 5, 2002]. Retrieved from the Internet <URL:http//www.aeritas.com/includes/press/Computerworld.htm>.

Wireless Today, Wireless Could be Cure For Travelers' Airport Woes [on–line], [retrieved on Feb. 5, 2002]. Retrieved from the Internet <URL:http//www.aeritas.com/includes/pressWirelessToday10–19.htm>.

Piller, Dan. Star–Telegram.com, Wireless airport check–in to use cell phones, hand–held computers, Oct. 18, 2000 [on–line], [retrieved on Feb. 5, 2002]. Retrieved from the Internet <URL:http//www.aeritas.com/includes/press/StarTelegram.htm>.

Aeritas Inc. Press—What's the Buzz?[on–line], [retrieved on Feb. 5, 2002]. Retrieved from the Internet <URL:http.//www.aeritas.com/Aeritas.jsp?function=press&sub=buzz>.

Aeritas Inc., Sitemap[on–line], [retrieved on Feb. 5, 2002]. Retrieved from the Internet <URL:http//www.aeritas.com/aeirtas.jsp?function–<sitemap>.

* cited by examiner

| TRAVEL |
|---|
| Airline ticket receipt |
| Airline boarding pass |
| Rent car reservation receipt |
| Hotel reservation receipt |
| Surface transport coupons |
| Lodging coupons |
| Restaurant coupons |
| Checkout |

| RECREATION |
|---|
| Sports event ticket receipt |
| Theater ticket receipt |
| National Park Service pass |
| Related event coupons |
| Memorabilia coupons |
| Restaurant coupons |
| Checkout |

| SHOPPING |
|---|
| Affinity program ID |
| Coupons by value |
| Coupons by category |
| Favorite store coupons |
| Competing store coupons |
| Checkout |

| LICENSES PASSES CARDS |
|---|
| Driver's license |
| Workplace security pass |
| Library card |
| Video rental card |

FIG. 2

| AIRLINE | MOBILE TICKET |
|---|---|

MOBILE TICKET

Thank you for purchasing your Airline Mobile Ticket. Please review the information below and make sure that it is correct If you have any questions or comments please cotact
Customer Service Departing from Rome (FCO):

Flight # A123

Date: 28/11/2000

Time: 9 00 AM

Arriving at Milano (LIN)

Flight # A123

Date: 28/11/2000

Time: 10:38 AM

To obtain your Mobile Ticket via WAP, please enter your imHandle and password imHandle Password

SUBMIT

FIG. 14

METHOD AND APPARATUS FOR ACQUIRING, MAINTAINING, AND USING INFORMATION TO BE COMMUNICATED IN BAR CODE FORM WITH A MOBILE COMMUNICATIONS DEVICE

CROSS-REFERENCE TO RELATED APPLICATIONS

This application claims the benefit of U.S. Provisional Application No. 60/252,101, filed Nov. 21, 2000 (Gobburu et al., Method and apparatus for acquiring, maintaining and using information to be communicated in bar code form with a mobile communications device); U.S. Provisional Application No. 60/252,346, filed Nov. 20, 2000 (Gobburu et al., Method and apparatus for acquiring, maintaining and using information to be communicated in bar code form with a mobile communications device); and U.S. Provisional Application No. 60/313,753, filed Aug. 20, 2001 (Gobburu et al., Method and apparatus for acquiring, maintaining and using information to be communicated in bar code form with a mobile communications device); all of which are hereby incorporated herein by reference in their entirety.

BACKGROUND OF THE INVENTION

1. Field of the Invention

The present invention related to mobile communications devices, and more particularly to acquiring, maintaining, and using information to be communicated in bar code form with a mobile communications device.

2. Description of Related Art

The use of bar code scanners in a great many aspects of everyday life is commonplace. Bar code scanners are found in many different types of facilities, including supermarkets, airport security, check-in and boarding areas, stadiums, libraries, test centers, conference centers, and many other places. The use of bar code scanners has dramatically increased the speed at which many commonplace transactions can be completed.

While typically printed on paper labels and stubs, bar codes may also be presented on the electronic displays of mobile communications devices. For example, in International Publication no. WO 00/03328 dated Jan. 20, 2000, Motorola Inc. of Schaumburg, Ill., describes the display of bar coded information on a selective call receiver ("SCR"). Demographic information concerning the user of the SCR is stored in the SCR. The demographic information is displayed on the SCR in bar code format such that it can be read by a bar code scanner, as in a store or at a point-of-sale. A stored coupon may also be displayed in bar code format so that it can be read and redeemed at the point-of-sale. A stored affinity card code and a unique identifier may also be displayed in bar code format so that they can be read to identify a selected affinity group and the customer at the point-of-sale. As a further example, Impulsity Inc. of Dallas, Tex., has proposed using voice recognition technology to allow a cellular telephone user to identify himself or herself while obtaining wirelessly from an airline computer an electronic bar coded boarding pass at the airport using only a cellular telephone. As proposed, the electronic boarding pass may be displayed as a bar code at the time of boarding on the screen of the cellular telephone so that the gate attendant may scan the boarding pass in a conventional manner.

BRIEF SUMMARY OF THE INVENTION

The ability to present bar coded coupons and user affinity information on a cell phone display from data resident in the local memory of the cell phone enhances the usefulness of the cell phone. Similarly, the ability to use a cell phone to obtain a bar coded electronic boarding pass obtained wirelessly from an airline computer for display during the boarding process also enhances the usefulness of the cell phone. Unfortunately, these capabilities are not coordinated. A cell phone that is specially programmed to provide coupon storage and access has no ability to obtain a bar coded electronic boarding pass obtained wirelessly from an airline computer for display during the boarding process. Conversely, a cell phone that is specially programmed to obtain a bar coded electronic boarding pass obtained wirelessly from an airline computer for display during the boarding process has no ability to provide coupon storage and access or affinity group information. Older cell phones may lack the ability to be suitably programmed at all, and even newer cell phones that can be programmed must be programmed by different vendors to provide both services.

Even if capable of being suitably programmed, many low end cell phones lack a large memory, thereby severely restricting the amount of information that can be stored. Moreover, to maintain coupons up to date requires synchronizing the coupon memory on the cell phone with an external data base, which requires periodic maintenance overhead.

Using a cellular telephone to obtain a bar coded electronic boarding pass obtained wirelessly from an airline computer for display during the boarding process has the notable disadvantage of requiring each airline to arrange a new, unproven and potential costly service, namely wireless voice secure access into its computer systems.

Accordingly, an object of some of the embodiments of the present invention is to provide for the unified and coherent access to diverse types of information.

Another object of some of the embodiments of the present invention is to utilize to a substantial degree existing and proven infrastructure for the convenient acquisition, maintenance and use of information to be communicated in bar code form with mobile communications devices.

These and other objects and advantages are realized in whole or in part by the various embodiments of the present invention. One embodiment of the invention is a method of communicating information in bar code form with a mobile communications device having an input capability for a user thereof. The method comprises making available to the user by the mobile communications device first information about diverse categories of information relating to the user; identifying at least one of the diverse information categories, with user input from the user input capability of the mobile communications device in response to the step of making available first information; obtaining by the mobile communications device second information relating to the identified category; and communicating the second information at least in part in bar code form with light from the mobile communications device.

Another embodiment of the present invention is a method of communicating information in bar code form with a mobile communications device having input capability and an information display capability for the user thereof. This embodiment comprises making available to the user by the mobile communications device descriptive information about diverse categories of information relating to the user, the descriptive information being organized under category headings; identifying at least one of the diverse information categories with user input from the user input capability of the mobile communications device in response to the step of making available descriptive information; making available to the user by the mobile communications device option information about various options for the user that relate to the identified category; identifying at least one of the options with user input from the user input capability of the mobile communications device in response to the step of making available option information; obtaining by the mobile communications device an item of information relating to the identified option; displaying the information item at least in part in user-readable form by use of the information display capability of the mobile communications device; and communicating the information item at least in part in bar code form with light from the mobile communications device.

A further embodiment of the present invention is a method of communicating information to a mobile communications device, the mobile communications device having user input and information display capabilities and the communicated information being suitable for display in bar code form by use of the information display capability of the mobile communications device. This method comprises furnishing for the mobile communications device first information about diverse categories of information relating to a user of the mobile communications device; receiving an identification of at least one of the diverse information categories made by the user input capability of the mobile communications device; and furnishing for the mobile communications device, in response to the receiving step, second information from the identified information category, the second information being furnished in a form suitable for wireless transmission to the mobile communications device and at least part of the second information being furnished in a form suitable for display in bar code form by use of the information display capability of the mobile communications device.

Yet another embodiment of the present invention is a computer-implemented method of employing one or more computers to enable a mobile communications device having user input and information display capabilities to communicate information in bar code form, the one or more computers having access to a network that includes a wireless link for wirelessly communicating with the mobile communications device. This method comprises receiving from the mobile communications device via the network a request for first information about diverse categories of information relating to a user of the mobile communications device; furnishing the first information to the mobile communications device via the network; receiving from the mobile communications device via the network an identification of at least one of the diverse information categories contained in the first information furnished to the mobile communications device in the first information furnishing step, the identification being in response to the user input capability of the mobile communications device; and furnishing to the mobile communications device via the network second information from the identified information category, in response to the information category identifying step, the second information comprising a component to enable the mobile communications device to display at least part of the second information in bar code form by use of the information display capability of the mobile communications device.

A further embodiment of the present invention is a method of controlling entry to a facility, comprising furnishing to the mobile communications device first information about diverse categories of information relating to a user of the mobile communications device, the categories of information including a ticket-related category; receiving an identification of the ticket-related category from the user input capability of the mobile communications device; and wirelessly furnishing to the mobile communications device, in response to the receiving step, ticket information from the ticket-related category, at least part of the ticket information being furnished in a form suitable for display in bar code form by use of the information display capability of the mobile communications device.

Yet another embodiment of the present invention is a method of communicating information in bar code form with a mobile communications device having user input and information display capabilities. This method comprises making available electronic access to diverse transactional information relating to a user of the mobile communications device, the transactional information being stored in a first non-transient memory comprising electronic memory of at least one computer system; identifying at least one transaction category in response to the user input capability of the mobile communications device; furnishing to the mobile communications device first information for the identified transaction category from the diverse transactional information stored in the first non-transient memory, at least part of the first information being furnished in a form suitable for communication in bar code form with light from the mobile communications device; receiving a communication with light from the mobile communications device of at least part of the first information in bar code form, with a bar code scanner; and processing the part of the first information obtained in the receiving step to obtain second information about use of the first information by the user, the second information being stored in a second non-transient memory comprising electronic memory of at least one computer system.

A further embodiment of the present invention is a method of processing coupons comprising issuing electronic coupons from an agency; furnish the electronic coupons to a delivery engine for storage in a database comprising diverse categories of information relating to a user of a mobile communications device; furnishing at least one of the coupons in electronic bar code form to a mobile communications device for communication with light from the mobile communications device; receiving, at the delivery engine, coupon usage data and a store identifier from a scan of light from the mobile communications device at a point-of-sale; forwarding the coupon usage data and an identifier for the point-of-sale from the delivery engine to a clearinghouse; preparing at the clearinghouse a report of coupon usage from the coupon usage data and the point-of-sale identifier; sending money from the clearinghouse to the point-of-sale based on the coupon usage report; and sending the coupon usage report to the agency.

Yet another embodiment of the present invention is a method of processing coupons comprising issuing electronic coupons from an agency; furnish the electronic coupons to a mobile communications device for storage in a database thereof comprising diverse categories of information relating to a user of the mobile communications device, and for communication of at least one of the coupons in electronic bar code with light from the mobile communications device; generating coupon usage data from a scan of light from the mobile communications device at a point-of-sale; forwarding the coupon usage data and an identifier for the point-of-sale from the point-of-sale to a clearinghouse; preparing at the clearinghouse a report of coupon usage from the coupon usage data and the point-of-sale identifier; sending money from the clearinghouse to the point-of-sale based on the coupon usage report; and sending the coupon usage report to the agency.

Another embodiment of the present invention is a mobile communications device comprising a wireless communications capability; a user input capability; and a plurality of software components for communicating information in bar code form with light from the mobile communications device. The software components comprise a component for acquiring first information about diverse categories of information relating to a user of the mobile communications device; a component for identifying at least one of the diverse information categories acquired by the acquiring component in response to the user input capability of the mobile communications device; a component responsive to the identifying component for acquiring via the wireless communications capability second information from the identified information category; and a component for communicating the second information at least in part in bar code form with light from the mobile communications device.

A further embodiment of the present invention is a mobile communications device comprising a communications capability; a user input capability; a memory; and a plurality of software components for managing a database of information in diverse categories relating to the user stored in the memory, and for communicating information in bar code form with light from the mobile communications device. The software components comprise a component for making available to the user first information about the diverse categories of information; a component for identifying at least one of the diverse information categories with user input from the user input capability of the mobile communications device in response to the first information made available by the first information making available component; a component for obtaining second information relating to the identified information category from the database; and a component for communicating the second information at least in part in bar code form with light from the mobile communications device.

Yet another embodiment of the present invention is a system comprising a network comprising a wireless component; a mobile communications device having a user input capability and a capability of communicating information in bar code form with light, and being coupled to the network via the wireless component thereof; a bar code scanner coupled to the network; a database maintained on at least one database server coupled to the network, the database comprising diverse transactional information in a plurality of transaction categories relating to a user of the mobile communications device; means for furnishing information about at least some of the transaction categories from the database to the mobile communications device via the network; means incorporated into the mobile communications device for identifying at least one of the transaction categories in response to the user input capability of the mobile communications device; means for furnishing first information for the identified transaction category from the database to the mobile communications device via the network, the first information having a capability of enabling the mobile communications device to communicate at least part of the first information in bar code form with light from the mobile communications device; means for receiving from the bar code scanner the part of the first information communicated in a bar code form with light; and means for process the part of the first information obtained in the receiving step to obtain second information about use of the first information by the user.

A further embodiment of the present invention is a system of processing coupons, comprising means for issuing electronic coupons from an agency; means for furnishing the electronic coupons to a delivery engine for storage in a database comprising diverse categories of information relating to a user of a mobile communications device; means for furnishing the coupons in electronic bar code form to a mobile communications device for communication thereof with light from the mobile communications device; means for receiving, at the delivery engine, coupon usage data and a point-of-sale identifier from a scan of light from the mobile communications device at a point-of-sale, the light communicating at least one of the coupons in bar code form; means for forwarding the coupon data and the point-of-sale identifier from the delivery engine to a clearinghouse; means for preparing at the clearinghouse a report of coupon usage from the coupon usage data and the point-of-sale identifier; means for sending money from the clearinghouse to the point-of-sale based on the coupon usage report; and means for sending the coupon usage report to the agency.

Yet another embodiment of the present invention is a system of processing coupons, comprising means for issuing electronic coupons from an agency; means for furnishing the electronic coupons to a mobile communications device for storage in a database thereon comprising diverse categories of information relating to a user of the mobile communications device, and for communication the electronic coupons in electronic bar code form with light from the mobile communications device; means for generating coupon usage data from a scan of light from the mobile communications device at a point-of-sale, the light communicating at least one of the coupons in bar code form; means for forwarding the coupon data and the point-of-sale identifier to a clearinghouse; means for preparing at the clearinghouse a report of coupon usage from the coupon usage data and the point-of-sale identifier; means for sending money from the clearinghouse to the point-of-sale based on the coupon usage report; and means for sending the coupon usage report to the agency.

BRIEF DESCRIPTION OF THE SEVERAL VIEWS OF THE DRAWINGS

FIG. 2 is a textual representation of various top level folders and their subordinate folders in the My Transactions database.

FIG. 14 is a pictorial representation of a Web page used for ordering airline tickets.

DETAILED DESCRIPTION OF THE INVENTION, INCLUDING THE BEST MODE

Figure 1:
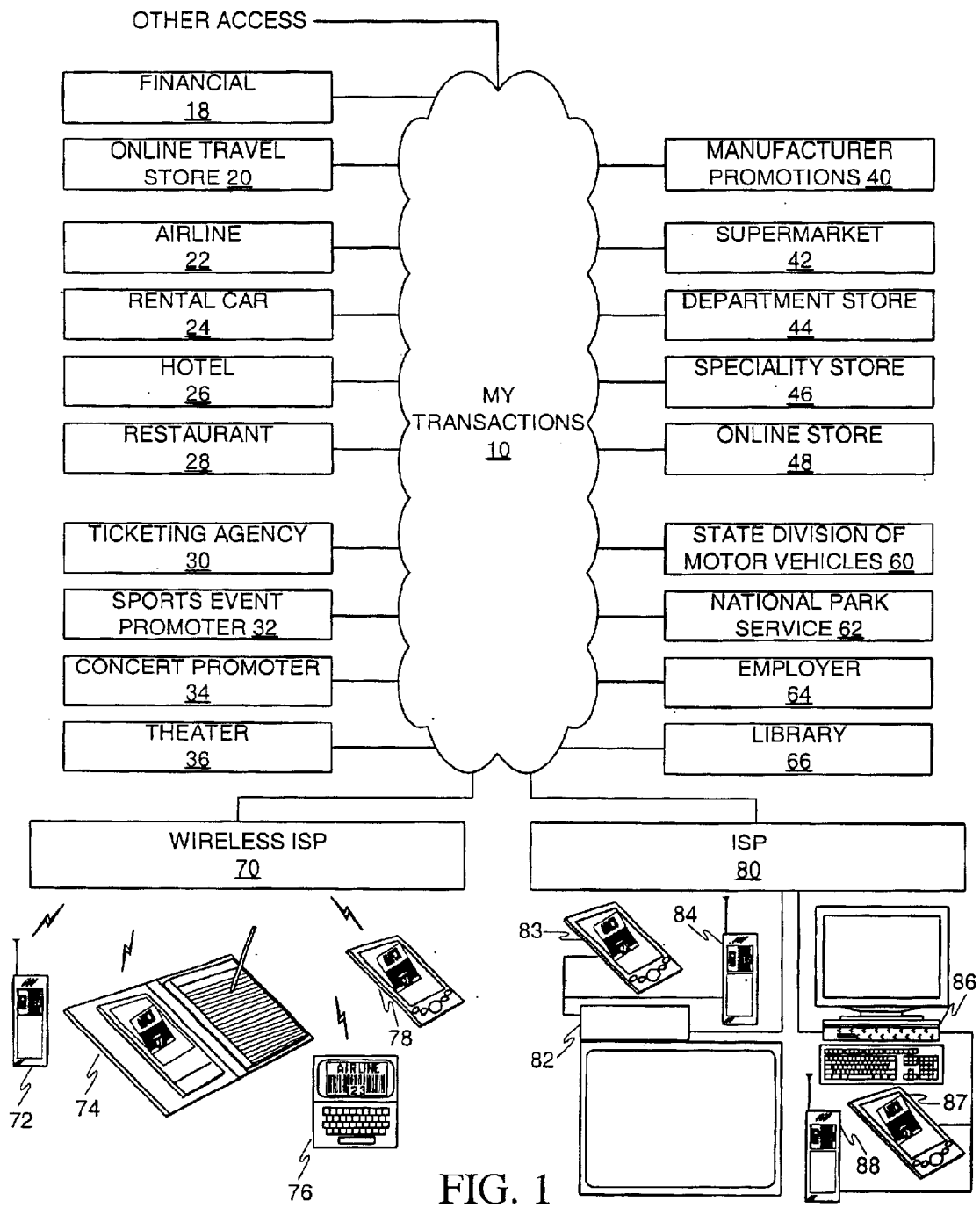
FIG. 1 is a schematic diagram showing a variety of different types of computer systems, internet service providers, and communications devices having access to a My Transactions database.

FIG. 1 is a schematic diagram showing a variety of vendor and governmental computer systems, internet service providers, and communications devices having access to a user's My Transactions database 10. The My Transactions database 10 contains diverse categories of information relating to the user. Employing a mobile communications device, the user causes a specific item of information to be communicated in bar code form with light from the mobile communications device by first selecting the category that contains the specific item of information, and then by selecting the specific item of information. Category information is acquired as needed by the mobile communications device from the My Transactions database 10. This reduces the memory requirement on the mobile communications device as well as facilitates changes to the categories and category headings by authorized third parties. However, category information may if desired be preprogrammed or downloaded into the mobile communications device and stored into local memory for use. Once a specific item of information is selected, the specific item of information is retrieved from the My Transactions database 10, which may be stored remotely of the user's mobile communications device, or which may be stored on the user's mobile communications device. The retrieved item of information is then communicated in bar code form with light from the mobile communications device, and the user simply presents the mobile communications device for scanning by a bar code scanner to obtain the desired good or service.

Communication of information in bar code form with light from a mobile communications device may be done in a variety of different ways, depending on the capabilities of the mobile communications device. One way is to display information in bar code form is as a conventional static bar code image on the screen display of the mobile communications device. The screen display may be any type, including light reflecting screens such as liquid crystal displays ("LCD") and light emitting screens such as of the thin film transistor ("TFT") type. The static screen display of a bar code image may be improved in various ways, such as, for example, by having the contrast and brightness automatically adjusted to optimize a static image for reading by a bar code scanner, or by using colors well separated within the visual spectrum (such as red and blue) to represent the various bars and spaces of a static color image to optimize the image for reading by a bar code scanner, or by some combination of these and other techniques. Information in bar code form may be communicated in an active manner by pulsing various light output devices of a mobile communications device to represent the various bars and spaces of a bar code image without necessarily displaying the image. As used herein, the term "light" refers to visible light and infrared light spectra, and the term "pulse" refers to a change in light level, where the particular characteristics of the change are not critical. The light pulses may be generated in any visible or infrared wavelength desired by any light source known in the art, such as by varying the brightness of a display screen (including a reflecting type) or by varying the brightness of a light emitting diode, a laser, an infrared transmitter, a backlight of an liquid crystal display screen, or a light bulb, just to name a few. Brightness may be varied by varying brightness or even by turning the light output device on and off. A number of examples of ways in which information in bar code form may be visually communicated are described in U.S. patent application Ser. No. 09/963,218, filed Sep. 25, 2001 (Challa et al., "System, method and apparatus for communicating information between a mobile communications device and a bar code reader," Attorney Docket No. 11085.00), and in U.S. patent application Ser. No. 09/963,298, filed Sep. 25, 2001 (Challa et al., "Static display of a bar code on a display of a mobile communications device," Attorney Docket No. 11201.00), which hereby are incorporated herein in their entirety by reference thereto.

The term "bar code scanner" is used generically throughout this document to include not only bar code devices that automatically move a light beam, but also those that rely on a clerk or other person to move manually the light beam, as well as devices that use charged coupled devices to capture the bar code image.

The "My Transactions" database 10 may be stored remotely of the mobile communications device or locally on the mobile communications device. A remotely stored "My Transactions" database has the advantages of essentially unlimited storage capacity and easy access by vendor, governmental and other computers to which access is granted. A locally stored "My Transactions" databases, that is, a database stored on the mobile communications device itself, has the advantages of accessibility when the wireless system is inoperative or unavailable, and suitability for implementation over a variety of different types of networks. Microbrowser-capable mobile communications devices compliant with the wireless access protocol ("WAP") specification as well as future higher-bandwidth protocols are very well suited for use with both remote and local "My Transactions" databases, and can use push or pull techniques such as are well known in the art, or a combination thereof. On the other hand, Short Message Service ("SMS") capable mobile communications devices compliant with such standards as the Global System for Mobile communications ("GSM"), Code Division Multiple Access ("CDMA"), and Time Division Multiple Access ("TDMA"), upon which today's Personal Communications Service ("PCS") networks are based, are very well suited for use with local "My Transactions" databases. SMS-capable mobile communications devices may, for example, be suitably pre-programmed to process and store pushed SMS messages containing information for a local My Transactions database.

Information in the various categories is non-transiently stored and originates from or pertain to various past and/or prospective transactions involving the user, such as purchases of tickets (inclusive of purchased licenses, passes, boarding passes, and so forth, as well as reservations therefore) made by the user, coupons (inclusive of passes, vouchers and other such incentives) given to the user by another entity, rights (inclusive of government issued social security cards and identity cards) to which the user is entitled, privileges (inclusive of government issued drivers licenses, library cards, passports, and so forth, and inclusive of privately issued security passes and so forth) granted to the user by another entity, financial arrangements (such as, for example, credit arrangements, debit accounts, prepaid vouchers, gift certificates, smart card phones, e-wallet, mobile phone storage of smart card data, mobile phone verification, and so forth) established by the user, and user supplied information useful in a prospective transaction. The other entity may be another person, a firm or corporation, or a governmental agency. Illustrative vendor and governmental computer systems and servers include financial institution or financial services company 18, online travel store 20, airline 22, rental car company 24, hotel 26, restaurant 28, ticketing agency 30, sports event promoter 32, concert promoter 34, theater 36, manufacturer promotions firm 40, supermarket 42, department store 44, specialty shop 46, online store 48, the state division of motor vehicles 60, the National Park Service 62, the user's employer 64, and a library 66.

Access by the user to wireless transmission services for communicating the user's information and the results of the user's selections to and from the user's mobile communications device preferably is had through a wireless ISP 70, which represents any wireless communications service provider, preferably having Internet access, that is able to handle wireless transmissions with the user's mobile communications device, including wireless operators providing SMS and WAP services, wireless application service providers ("ASP"), and specialty service providers. If desired by the user to augment the user's mobile access, non-mobile, or fixed, access to transmission services for communicating the user's information and the results of the user's selections to and from a non-mobile device, such as, for example, a set top box 82 or a personal computer or workstation 86, may be had through an ISP 80 that preferably has Internet access, such as a dial up, DSL or cable Internet service provider. Information may also be communicated to the user's mobile communications device through the user's non-mobile device in any desired manner.

The user's information may be communicated by any suitable direct or indirect manner, including the Internet, wide area networks, local area networks, and other wired and wireless solutions. Wireless mobile access for such communication may be direct, or may be indirect communication via networks over which the information sources furnish information. Many different types of mobile communications devices are well known and commercially available today, and a myriad of new mobile communications devices are likely to be introduced. These devices exhibit great variety in their user input capabilities, display capabilities, and lighting capabilities (e.g., light emitting diodes, infrared transmitters, light reflecting screens, screen backlighting, light emitting screens, and so forth). Examples of mobile communications devices include personal data assistants ("PDAs") operating under such operating systems as the Palm™ operating system and the Windows™ CE operating system, two-way pagers, some types of consumer wireless Internet access devices ("CADs") and Internet appliances, GSM phones and WAP-enabled phones available from various manufacturers such as Nokia of Helsinki, Finland, and Telefonaktiebolaget LM Ericsson of Stockholm, Sweden, personal communication system ("PCS") phones, multi-function wireless "smart" phones such as the iMODE phone available from NTT Docomo of Tokyo, Japan. Advancements in mobile phones include browser-enabled phones using such protocols as J2ME (Java 2 Micro Edition) and the Wireless Access Protocol ("WAP"). Other advances include wireless internet devices ("WID") which combine PDA functions, phone functions, and wireless browser functions in a device having an open software architecture, a display that is relatively large and with relative good resolution, and stylus entry. In FIG. 1, a few examples of the enormous diversity of mobile communications devices that are supported for wireless communications include a WAP phone 72, a SmartPad notepad 74 such as is available from Seiko Instruments of Torrance, Calif., and equipped with a wireless PDA device, a two way pager 76, and a communications-enabled personal data assistant 78. Many different kinds of communications-enabled PDAs are available. Examples include the Palm VII connected organizer, which is available from Palm Computing, Inc. of Santa Clara, Calif.; the pdQ smartphone, which is available from QUALCOMM Incorporated of San Diego, Calif.; and a variety of PDAs suitably equipped with attached wireless modems such as, for example, the Palm III and V connected organizers with Minstrel® Wireless Palmtop Modems from Novatel Wireless Inc. of San Diego, Calif., which are distributed by Omnisky Corp. of Palo Alto, Calif. Other examples include a number of devices based on the Windows™ CE operating system such as the various devices available from, for example, Compaq Computer of Houston, Tex., Hewlett Packard of Palo Alto, Calif., Casio Corporation of Tokyo, Japan; and the Revo organizer available from Psion PLC of London, England. Another illustrative platform is the Wireless Internet Device ("WID"), a type of device that includes the functionality of a phone as well as a PDA, WAP browser, and HTML browser. An example of a WID device is the communicator platform, which is being developed by Ericsson. Any suitable wireless technology may be used, including, for example, GSM, CDMA, TDMA, GRPS and UMTS, all of which support data-bearing protocols such as SMS and WAP. A few examples of the enormous diversity of mobile communications devices that are supported for wired communication with the user's non-mobile device include personal data assistant 83 and mobile phone 84, which can be selectively wired to the set top box 82, and personal data assistant 87 and mobile phone 88, which can be selectively wired to the computer/workstation 86. Examples of user input capabilities offered by these devices include keypad, keyboard, stylus, ink, handwriting recognition, voice recognition, and so forth. Examples of display capabilities offered by or suitable for these devices include liquid crystal ("LCD") displays, thin film transistor ("TFT") displays, eyeglass displays (also know as personal viewing devices), heads up displays, and so forth Techniques for enabling graphical images such as bar codes to be shown on these devices are well known in the art, and include, for example, bit maps; JIF, GIF and other graphical file types; and instructions that upon execution recreate the image.

Although shown as a separate and distinct feature in FIG. 1 for conceptual purposes, the My Transactions database 10 may be hosted on any device having access to the wireless or wired network over which the user's mobile communications device connects, including, in particular, on the user's mobile communications device itself, on the user's non-mobile device, or on any Internet accessible server, and may even be distributed among several different servers and computers, or across several database files. Preferably, the My Transactions database is hosted on the user's mobile communications device, or by a portal such as Yahoo! or by the wireless ISP 70. Although a separate wireless ISP 70 and a separate ISP 80 are shown, the user may use a single portal for both wireless and wired access, or may use multiple ISPs for either wireless access, wired access, or both wireless and wired access.

Where the My Transactions database is hosted on the mobile communications device itself, a variety of different techniques may be used to place user information into the My Transactions database, including both wireless as well as wired techniques. User information may be delivered wirelessly on, for example, WAP capable or SMS capable mobile communications devices using push or pull techniques. User information may be delivered via wire on, for example, modem-equipped mobile communications devices, or may be delivered via wire or wirelessly through synchronization between a mobile communications device and a non-mobile device such as the set top box 82 or the computer/workstation 86. The synchronization of personal data assistants and certain types of mobile phones with personal computers is well known, and can be employed to place user information into a local My Transactions database in the following illustrative manner. Information in bar code form is sent to the user's non-mobile device as an email attachment in, for example, the Palm operating system format. Suitable formats include the .pcr format, an executable file, or .pdb format, a data file. After the emails containing the bar code form information (and perhaps other information as well, such as information for the user) are received by the user's non-mobile device, the personal data assistant is synchronized to the user's non-mobile device, resulting in the bar code form information (and other information, if present) being downloaded into the personal data assistant.

Generally speaking, a local My Transactions database may be synchronized with any remote database. For instance, copies of the My Transactions database may be maintained both on a server as well as on the user's mobile communications device. Synchronization of the two copies of the database is performed by any suitable technique, including techniques well known in the art. The synchronization may be performed by manual command, in response to a triggering event such as turning on of the mobile communications device, on a scheduled time, or in any other suitable manner.

The My Transactions database 10 is a secure but easily accessible and manageable depository for information that relates to the user's transactions, and especially for information that may be represented and used in bar code form on a mobile communications device. Examples of various categories and category headings that are suitable for inclusion in the My Transactions database are shown in FIG. 2. In the illustrative example of FIG. 2, the categories of information illustratively are organized into top level and subordinate level folders, although other suitable arrangements such as a single list of the categories of information may be used instead. Illustratively, the user has four top level folders in her My Transactions database: "Travel," "Recreation," "Shopping," and "Licenses, Passes and Cards." The various folders are shown in "list" view. Generally, top level folders and subordinate folders may be shown in any desired type of view, including list, icon, detail, thumbnail, and so forth.

Assume for the purposes of FIG. 2 that the user has planned a business trip for which she has made airline, rental car, and hotel reservations. Accordingly, the "Travel" folder illustratively contains the following subordinate folders: airline ticket, airline boarding pass, rental car reservation receipt, and hotel reservation receipt. During the reservation process, the vendors may have issued discount and other promotional coupons, giving rise to the following additional subordinate folders: surface transport coupons, lodging coupons, and restaurant coupons. Assume also that the user has made arrangements to see a sports event when she returns and then go camping over the weekend. The user also has booked two seats at the opera, which she intends to give to her parents as a gift. Accordingly, the "Recreation" folder illustratively contains the following subordinate folders: sports event ticket receipt, theater ticket receipt, and National Park Service pass. During the reservation process, the vendors may have issued discount and other promotional coupons, giving rise to the following additional subordinate folders: related event coupons, memorabilia coupons, and restaurant coupons. Assume also that the user routinely goes grocery shopping. Accordingly, the "Shopping" folder illustratively contains the following subordinate folders: affinity program ID, coupons by savings, coupons by category, coupons at the user's favorite stores, and competing store coupons. Assume also that the user routinely requires access to certain licenses, passes, and borrower cards. Accordingly, the "licenses, Passes and Cards" folder contains the following subordinate folders: driver's license, workplace security pass, library card, and video rental card.

By using a mobile communications device to access the information in the My Transactions database and to communicate information in bar code form with light, the user may entirely avoid having to carry about paper tickets, paper receipts and paper discount and promotional coupons for the various planned trips and activities. Formation about the categories and category headings may be acquired from a My Transactions database stored locally in the memory of the mobile communication device or stored on a remote server, as desired by the user or the manufacturer of the mobile communications device, or in accordance with the capabilities of the mobile communications device.

Figure 3:
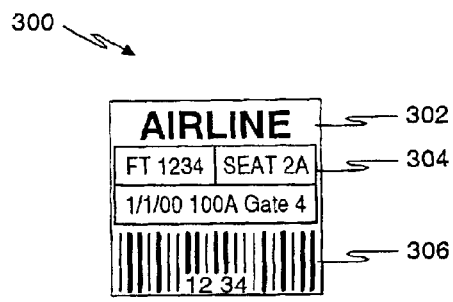
FIG. 3 is a pictorial representation of an airline bar coded boarding pass.

Assume that to begin a trip, the user requires a boarding pass. An example of a bar code style boarding pass 300 suitable for display on the screen of a mobile communications device is shown in FIG. 3. The boarding pass 300 includes the name of the airline (element 302); a group of text (element 304) indicating the flight number, the seating assignment, the departure date and time, and the gate number; and the bar code itself (element 306). The bar code 306 includes the numbers 1234, which is the information represented by the bar code itself.

Figures 4, 5, 6, 7:
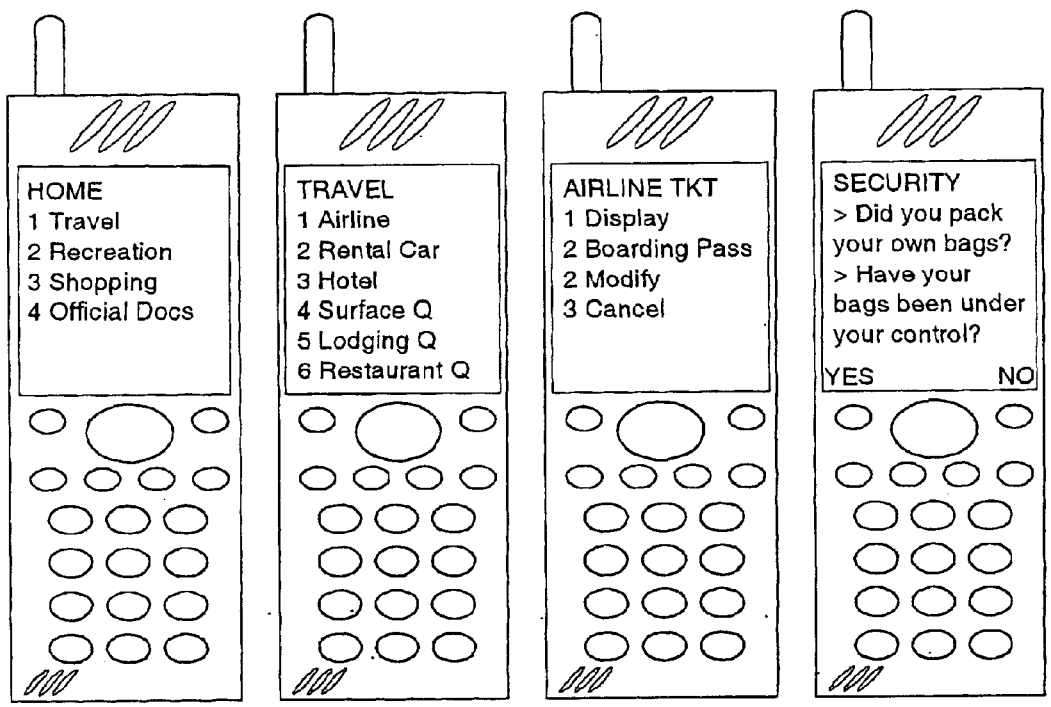
FIGS. 4 through 8 are sequential pictorial representations of a mobile phone being used in the airline boarding process.
Figure 8:
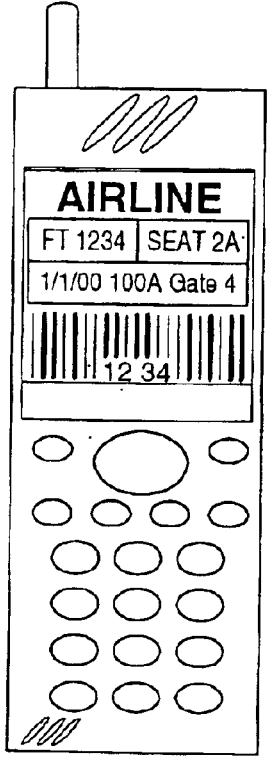

An illustrative basic procedure by which the user may obtain a boarding pass for display on, or for communication with light from, a mobile communications device such as a WAP-enabled or SMS-enabled mobile phone when passenger identification is not required is shown in FIGS. 4 through FIG. 8. The user accesses his home account to cause the various top level folders of the My Transactions database to be displayed on the mobile phone, as shown in FIG. 4. The user may navigate to select "Travel" or touch "1" on the keypad, thereby causing display of various subordinate folders under "Travel" as shown in FIG. 5. The user may navigate to select "Airline" or touch "1" on the keypad of the mobile phone, thereby causing various options to appear in menu form as shown in FIG. 6. The user may navigate to select the option "Boarding Pass" or touch "2" on the keypad, thereby causing the security questions about luggage mandated by federal security rules to be presented as shown in FIG. 7. If the user answers both questions appropriately, a boarding pass is issued and placed into the user's "My Transactions" database, and information in bar code form is communicated with light from the mobile communications device by, for example, being displayed as a static image on the users mobile communications device as shown in FIG. 8.

While the use of options provides the user with great flexibility and functionality, the use of options is not necessary. For example, selecting "Airport" may simply cause a boarding pass to be displayed on the user's mobile communications device in a manner perceivable to the user, as well as to be communicated in bar code form with light from the user's mobile communications device so that it can be read by a bar code reader.

The foregoing procedure assumes that the ticketed segments will be used sequentially. If desired, the wireless ISP 70 may automatically report the location of the mobile phone so that the airline computer is able to determine the user's location and issue the appropriate boarding pass automatically, even if a flight segment is skipped. Alternatively, the user may be presented with a menu for selecting any unused ticketed segment against which the boarding pass is issued.

Figure 9:
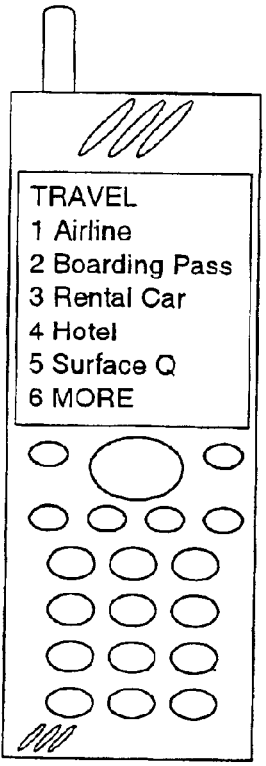
FIG. 9 is a pictorial representation of a mobile phone being used to access a boarding pass after it has been issued.

In the event that the user wishes to use the mobile phone for another purpose before presenting a displayed bar coded mobile boarding pass for scan, the boarding pass display is lost on most types of mobile communications devices. However, the mobile boarding pass remains available in the My Transactions database and may be used to board the aircraft until the gate agent redeems the boarding pass when the user boards the aircraft, and may be redisplayed by the user as desired simply by accessing the My Transactions database and navigating through the subordinate folders of FIGS. 4 and 9. The subordinate folders of FIG. 9 are similar to the subordinate folders of FIG. 5 except that a new subordinate folder "Boarding Pass" has been created since the airline ticket has been redeemed for a flight segment. Alternatively, the "Boarding Pass" subordinate folder could have been created when the "Airline" subordinate folder was created, in anticipation of the need for it later. The "Airline" subordinate folder remains for such purposes as checking itinerary, changing any remaining flight segments, and issuing boarding passes for any remaining flight segments. It will be appreciated that if the boarding pass bar coded information is communicated with light using capabilities of the mobile communications device other than the screen, the ability to communicate the mobile boarding pass is not lost when the mobile communications device is used for another purpose.

It will be appreciated that shortcut keys may be programmed to access directly any information in any of the subordinate folders of the My Transactions database.

Passenger identification may be added to the boarding pass issue procedure in any suitable manner. For example, the airline may provide a special ticket agent who is dedicated to confirming the user's identity by, for example, inspecting a picture identification such as a physical driver's license or an electronic bar coded driver's license stored in the user's Official Documents subordinate folder in the My Transactions database, as well as confirming correct answers to the security questions, thereby providing a fast, efficient and secure boarding process for passengers using their mobile communications devices to access and communicate boarding passes in bar code form.

Figure 10A:
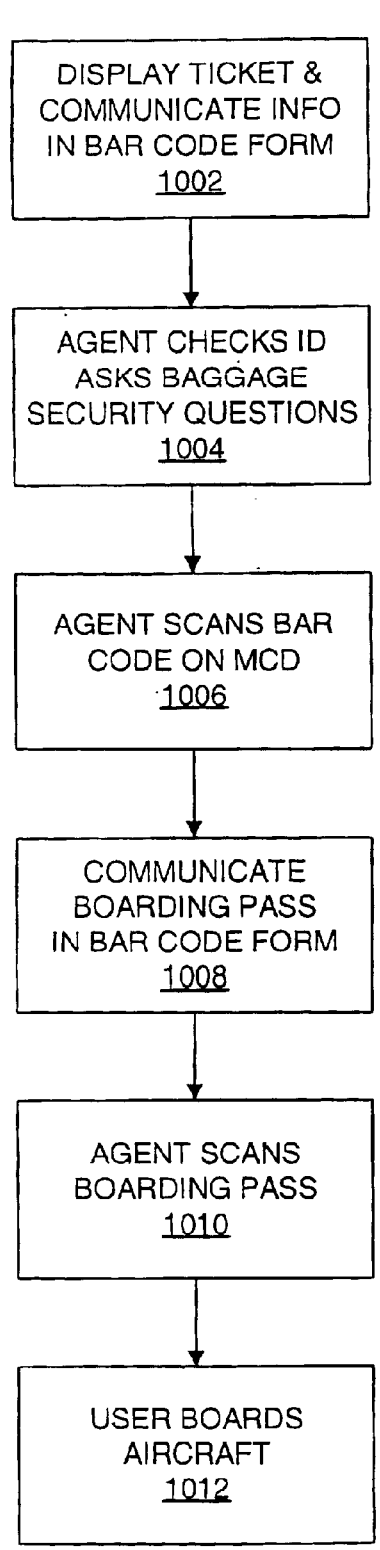
FIG. 10A and FIG. 10B are flowcharts of an airline boarding process in which the identity of the boarding passenger is confirmed.

FIG. 10A shows an example of a process involving a special ticket agent's interaction with the user. The user displays the purchased ticket in the manner previously described (block 1002). The display on the user's mobile phone preferably shows information of interest to the user, such as the airline 302 and the flight number, seat number, date, time and gate information 304. Other information that is of interest to the airline, including either actual information identifying the ticket or a code that is used to access this information, is communicated in bar code form with light from the user's mobile communication device, which could be the bar code 306 displayed on the screen (FIG. 3) or another technique as described elsewhere herein. After checking the user's identification and obtaining satisfactory answers to the baggage security questions (block 1004), the special ticket agent scans the user's mobile phone using a bar code scanner (block 1006) to obtain the information of interest to the airline. Either the boarding pass is automatically communicated with light, or the user may select the boarding pass for communication with light from the mobile phone (block 1008). As in the case of the ticket, the display on the user's mobile phone for the boarding pass preferably shows information of interest to the user, such as the airline, the flight number and travel segment, the seat number, the date, the departure time, and gate information. Other information of interest to the airline, which includes either actual information identifying the boarding pass or a code that is used to access this information, is communicated in bar code form with light from the user's mobile communication device, which could be a bar code like the bar code 306 displayed on a screen (FIG. 3) or another technique as described elsewhere herein. The gate agent then scans the boarding pass (block 1010) and permits the user to board the aircraft (block 1012) since the boarding pass is valid.

Other techniques for confirming the passenger's identity may also be used, including, for example, the technique proposed by Impulsity Inc. and referred to previously.

Preferably, the updating—including retirement—of tickets, boarding passes, and other bar coded documents for mobile communications devices is handled by the computers of the business or governmental entity responsible for issuing the documents, or by their surrogates. In this way, measures can be taken by the issuing entities or their surrogates to ensure that information about the mobile documents retained in the user's My Transactions database are appropriately updated in a timely manner, including retirement of the documents as appropriate, so that the mobile documents stored in the user's My Transactions database cannot be misused. In addition, the person performing the bar code scan is relieved of the need to take any additional and perhaps time consuming actions to retire the mobile document on the mobile communications device. Such actions could involve handling of the user's mobile communications device by the person performing the bar code scan, which would be undesirable. Moreover, the person performing the bar code scan might neglect to perform such actions or perform them improperly, thereby resulting in even greater potential for misuse. Nonetheless, the person performing the bar code scan may be required to take such actions to retire the mobile document, if desired.

Figure 10B:
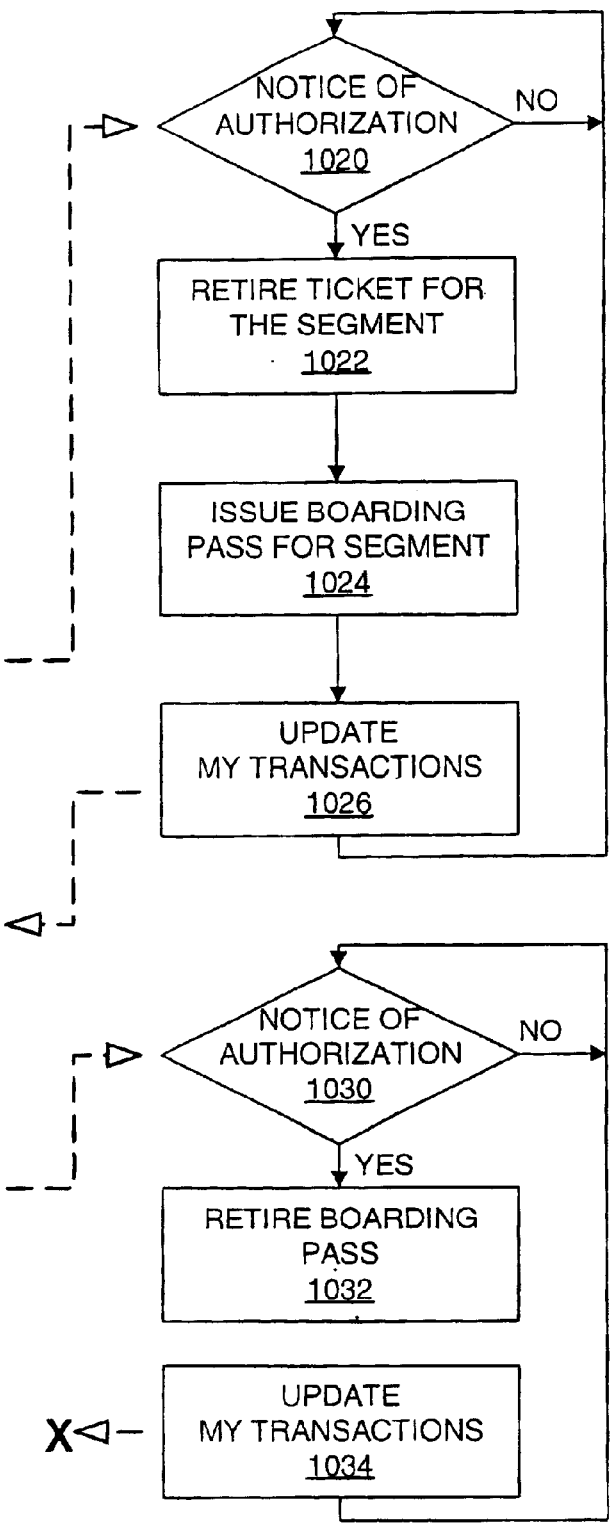

FIG. 10B shows an example of the interaction of the airline computer with the special ticket agent process of FIG. 10A. The special ticket agent's scanner sends an authorization notice to the airline computer when the relevant information pertaining to the mobile ticket and communicated with light from the user's mobile communications device is scanned. When the authorization notice is detected (block 1020—yes), the ticket is retired for the appropriate flight segment (block 1022), a boarding pass for the flight segment is issued (block 1024), and the My Transactions database is updated (block 1026) to create a mobile boarding pass bar coded document and, if desired, to indicated that the ticket segment for which the boarding pass has been issued is retired. The airline computer then awaits another notification (block 1020—no). Since the ticket segment for which the boarding pass has been issued is no longer valid, the ticket may not be used again to issue another boarding pass for the same segment.

The special ticket agent's scanner also sends an authorization notice to the airline computer when the bar coded mobile boarding pass communicated with light from the user's mobile communications device is scanned. When the authorization notice is detected (block 1030—yes), the boarding pass is retired (block 1032) by the airline computer and the My Transactions database optionally is updated (block 1034) to indicated that the boarding pass has been retired due to use. If desired, re-communication of the boarding pass after use may be disallowed as indicated by the "X" at the end of the dashed line extending from the update block 1034, thereby preventing misuse. However, the updating of the "My Transactions" database and disallowance of re-communication of the boarding pass is not necessary, since the airline computer keeps track of the retirement of the boarding pass. The airline computer then awaits another notification (block 1030—no).

The scanning of the boarding pass by the gate agent may trigger other actions, such as, for example, the crediting of frequent flyer miles to the user's frequent flyer mileage account. This would be handled by the airline computer.

Once the user has a properly issued boarding pass, the user may use the boarding pass for other authorized purposes. For example, an airline may set up a self-service agent-monitored luggage check counter whereby the user presents the boarding pass information in bar code form to a check counter scanner and indicates the number of bags to be checked. The check counter equipment prints adhesive luggage tags which the user applies to his or her bags, and deposits a mobile checked baggage receipt into the user's My Transactions database. The checked baggage receipts are communicated and retrieved generally using the techniques described previously.

Figure 11:
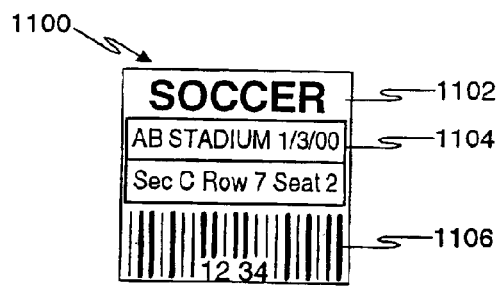
FIG. 11 is a pictorial representation of soccer sports event ticket.

A sports event pre-purchased ticket is used in the following exemplary manner. Upon reaching the stadium, the user accesses her My Transactions database and causes a sports event mobile ticket to be communicated in bar code form with light. An example of a bar code style sports event mobile ticket 1100 suitable for display on a mobile communications device is shown in FIG. 11. The sports event mobile ticket 1100 includes the name of the event (element 1102); a group of text (element 1104) indicating the stadium, date, and seat location; and the bar code itself (element 1106).

Figure 12:
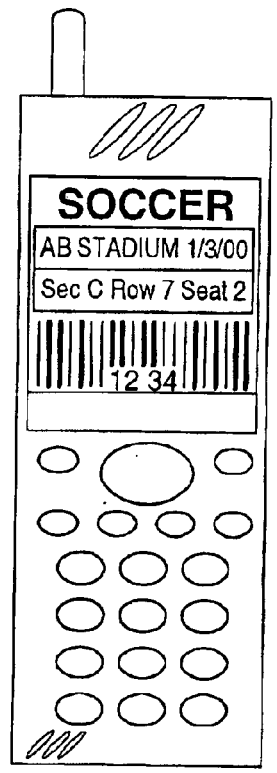
FIG. 12 is a pictorial representation of a soccer sports event ticket on a mobile phone being used to gain entry to a stadium

FIG. 12 shows the bar coded sports event mobile ticket being displayed on, for example, a mobile phone. Upon entering the stadium, the user accesses the My Transactions database, causes the bar coded sports event ticket to be displayed or otherwise communicated with light from the mobile phone, and presents the mobile phone to the gate agent. The gate agent scans the bar code, and the event promoter's computer then updates its own data base, and optionally updates the user's My Transactions database to indicate that the ticket has been used (i.e. retires the ticket) and replaces the ticket with a bar coded ticket stub to allow the user to reenter the stadium if she temporarily leaves the stadium during the event. The ticket stub may simply time out and delete itself after a time, or the promoter's computer may access and delete the stub at the end of the event, or the ticket stub may persist until manual deletion by the user.

Being an avid camper, the user has purchased a National Park Service annual pass which entitles the user to an unlimited number of visits over a specific period of time. The annual pass is used in the following manner. Upon approaching the park, the user accesses his My Transactions database, causes the bar coded park pass to be displayed or otherwise communicated with light from the mobile phone, and presents the mobile phone to the entry station ranger. If the ranger has no bar code scanner, she would still be able to visually confirm whether the park pass appears to be valid since the expiration date preferably is displayed as the bar code is communicated. However, scanning the bar coded mobile park pass is preferred because the NPS computer is able to check validity of the mobile park pass by using the scanned information to consult its own records. The NPS computer has no need to update the user's My Transactions database based on the user's visit, although it may keep track of certain statistical information for later reporting to government officials on park visitation. However, upon the date of termination, the NPS computer may optionally access the user's My Transactions database and invalidate the park pass if it has terminated, or extend it if another annual term has been purchased. Alternatively, the pass stored in the My Transactions database may simply time out and delete itself at the expiration of the annual term.

Figure 13:
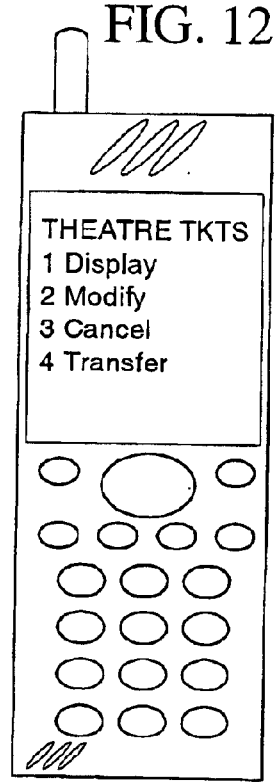
FIG. 13 is a pictorial representation of a mobile phone being used to transfer theater tickets to another person after they have been purchased.

The user has also purchased a pair of theater tickets which the user intends to give as a gift. The user accesses the My Transactions database and navigates to the Theater subordinate folder, which displays a number of options as shown in FIG. 13. The options are to display the tickets, to modify the tickets, to cancel them, or to transfer them It is instructive to compare FIG. 13 with FIG. 6, which does not include a "Transfer" option. This is because the airline ticket to which FIG. 6 pertains is not transferable.

The tickets may be transferred in any suitable manner. For instance, the user may log onto the vendor's Web site and perform the transfer. However, the tickets may be particularly easily transferred using instant messaging when the parents appear as a buddy. An instant message is prepared informing the parents of the gift, and the ticket data from the My Transactions database is treated as an attachment to the instant message. Various attributes associated with the ticket are checked to ensure that the user has the authority to make the transfer, and a record of the transfer is maintained, see FIG. 19 (Field "TransferHistory"). If desired, the user's My Transactions database may be provided with a record of the transfer so that the ticket agency computer is able to locate the mobile tickets when it requires access to them for updating and other purposes. Alternatively, the software managing the My Transactions database generates a notification to the ticket agency computer informing it of the transfer, whereby the ticket agency computer may update its database. Well known public Internet portals offering instant messaging include America Online, Microsoft Network, and Yahoo!

As is apparent from the foregoing, tickets (as well as coupons and other such bar coded documents) are retired in several different ways, depending on the type of ticket. If the ticket is a single use ticket, the ticket may be retired from the My Transactions database by the vendor, and also from the mobile communications device if the user's My Transactions database is remote from the user's mobile communications device. If the ticket is a multiple use ticket, the ticket is not retired from the user's My Transactions database until the last use, but may be retired on the mobile communications device after each use if the user's My Transactions database is remote of the user's mobile communications device. If the ticket has a limited duration, the ticket is not retired from the user's My Transactions database until the date of termination, but may be retired on the mobile communications device after each use if the user's My Transactions database is remote of the user's mobile communications device.

Tickets may be purchased in any manner convenient to the user, ranging from purchase at "brick and mortar" establishments such as an airline ticket office, a stadium ticket office, and so forth, online purchases using the Internet, or automated purchases from a cell phone. An example of an online airline ticket purchase using a standard browser running on a personal computer is shown in FIG. 14. After completing the passenger profile, including credit card information, and purchasing the ticket, the page shown in FIG. 14 allows the passenger to obtain the mobile ticket via her mobile phone by entering her instant messaging handle and her password.

Figure 15:
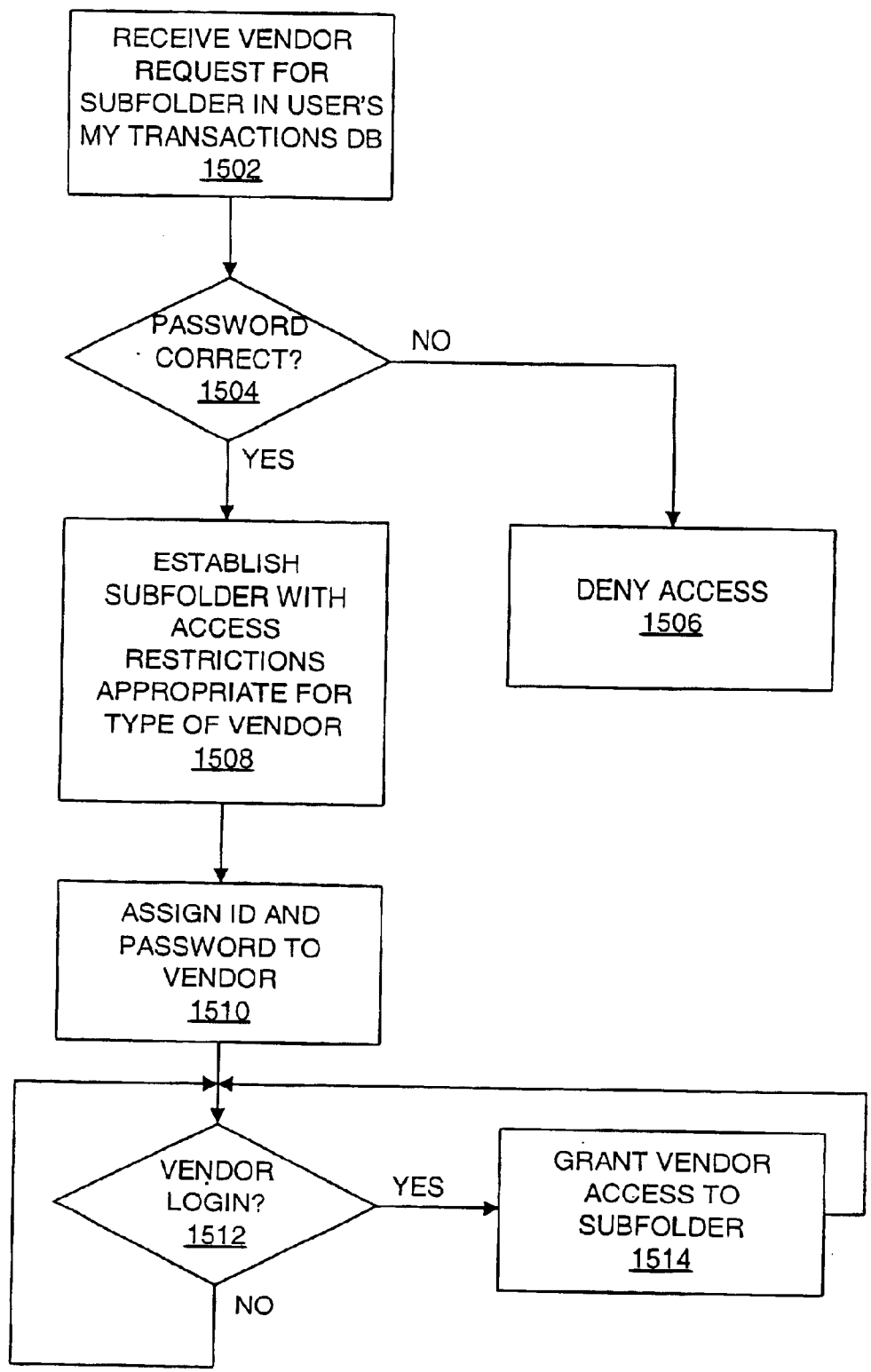
FIG. 15 is a flowchart showing a process whereby vendors obtain access to subordinate folders in the My Transactions database.

If the user's My Transactions database is remote of the user's mobile communications device, FIG. 15 shows an illustrative process carried out by, for example, a server that hosts the user's My Transactions database when an airline ticket is purchased. Other ticket purchases are similar. A request is received by the server that hosts the user's My Transactions database from the vendor's server to create and access a subordinate folder in the user's My Transactions database, based on the instant message user name "imHandle" provided by the user (block 1502). The user supplied password, which is maintained secure, is checked to determine if the user in fact authorized the transaction. If the password check fails (block 1504—no), the vendor is denied access (block 1506). If the password check is successful (block 1504—yes), a subordinate folder is established under the appropriate top level folder for the type of vendor and with access restrictions appropriate for the type of vendor (block 1508). The vendor is assigned a name and password (block 1510) which the vendor may use for access (block 1512—yes, block 1514). In the case of an airline ticket, the airline server may access the subordinate folder for such operations as retiring ticket segments, modifying the ticket, canceling the ticket, depositing boarding passes, retiring boarding passes, and depositing baggage receipts.

The user may, if desired, pay for tickets as well as other goods and services at a point-of-sale using her mobile communications device, and have the transaction recorded in an appropriate subordinate folder in the user's My Transactions database. Payment is made using any mobile payment technique, which may or may not involve the communication of information in bar code form One example of a mobile payment technique is the smart card phone, which is a mobile phone that has a built-in smart card reader. The user places an order to purchase a good or service using the mobile phone in any desired manner. The merchant's server sends a payment request to the mobile phone. The user then inserts her smart card, which is a charge card with a small embedded computer chip that enables applications such as security, electronic purse, history, loyalty, identification, and so forth. The mobile phone requests a personal identification number ("PIN") to for authentication. If the PIN is correct, the phone assembles a data package containing the order number as well as the account information and shipping information from the smart card, and sends the data package to the merchant's server. The merchant's server in turn sends an order confirmation to the mobile phone and suitably places a record of the transaction in the user's My Transactions database. Another example of a mobile payment technique is the mobile-accessed bank wallet, or e-wallet. This technique involves having the user's account information stored on a bank's server. The user places an order to purchase a good or service using a mobile phone in any desired manner, and the merchant returns an order confirmation. The user then logs into her e-wallet on the bank's server using her name and PIN. Upon authentication, the mobile phone sends the order information to the bank's server and the user selects the account and shipping address. The bank's server sends the authorization information to the merchant's server, which in turn sends a confirmation to the user's mobile phone and suitably places a record of the transaction in the user's My Transactions database. Another example of a mobile payment technique is the storage of smart card data in the mobile phone itself. The user places an order to purchase a good or service using the mobile phone in any desired manner. The merchant's server sends a payment request to the mobile phone. The user's mobile phone contains a subscriber identity module ("SIM" card) which stores the user's authentication, account, and shipping information. The mobile phone requests a PIN to authenticate the user. If the PIN is correct, the phone assembles a data package containing the order number as well as the account information and shipping information from the subscriber identity module, and sends the data package to the merchant's server. The merchant's server in turn sends an order confirmation to the mobile phone and suitably places a record of the transaction in the user's My Transactions database. Another example of a mobile payment technique is mobile phone verification. The user places an order to purchase a good or service in any desired manner, even at a physical point-of-sale, and also provides her mobile phone number. The merchant's server sends a payment request to the mobile phone. The user reviews and confirms the order and enters her pin for authentication, and the user's mobile phone assembles and sends a data package to the bank's server. The bank's server sends the authorization information to the merchant's server, which in turn sends a confirmation to the user and suitably places a record of the transaction in the user's My Transactions database. Another example of a mobile payment technique is redeeming a prepaid coupon or voucher, which is done in a manner similar to the redemption of any coupon. In this type of mobile payment technique, the coupon or voucher number is displayed on the user's mobile communications device or otherwise communicated with light as a bar code. The communicated bar code is scanned and processed by the vendor in a conventional manner. The payment processes mentioned above preferably are protected by suitable security measures such as encryption to prevent unauthorized access. Some of the proposals for mobile commerce are described on the web site of MasterCard International Incorporated of Purchase, New York, at www.mastercardintl.com/newtechnology/mcommerce/whatis/payment.html, which is incorporated herein by reference in its entirety.

The user also has access to a bar coded workplace security pass through his mobile communications device. To prevent unauthorized access, the workplace security pass folder preferably is suitably encrypted and password protected. Upon approaching the workplace, the user accesses the My Transactions database, causes the bar coded workplace security pass to be displayed or otherwise communicated with light, and presents his mobile phone to a scanner located at the entrance to the workplace. The scan is automatically completed and the door is unlocked if the bar coded pass is valid. The bar code is changed frequently so that employees whose authorizations are revoked are unable to obtain the new bar code and are unable to gain access using the old bar code. The old bar code is overwritten by the new bar code in the My Transactions database of every current and authorized employee so that they may possess the new bar code and gain access as desired.

The user also has access to a bar coded driver's license. To prevent unauthorized access, the driver's license folder preferably is suitably encrypted and password protected. The bar coded driver's license also includes a picture for identification purposes, so that it is preferably suitable for larger high resolution screens. By scanning the bar code image or other communication of the information in bar code form with light, a complete and accurate record of the driver's license information is rapidly and easily made, which is useful in retail transactions as well as traffic enforcement.

The user also has access to a variety of coupons and promotional material. FIG. 2 shows one illustrative way of organizing coupons, although a variety of different ways are possible. The user's coupons are stored in one or more subordinate folders in the user's My Transactions database. The user navigates to the appropriate subordinate folder and cycles through the stored coupons until he finds one of interest, or may instead perform a keyword search from the mobile communications device keypad or other input device for a coupon of interest. Once the coupon of interest is found, the user selects it using any suitable input device. A checkout subordinate folder may be used if desired for the user's convenience. If a single use coupon, the selected coupon is moved to the checkout subordinate folder; otherwise a copy is placed in the checkout subordinate folder. Placing coupons in the checkout subordinate folder allows the coupons to be easily and conveniently displayed or otherwise communicated with light from the mobile communications device during checkout.

Figure 16:
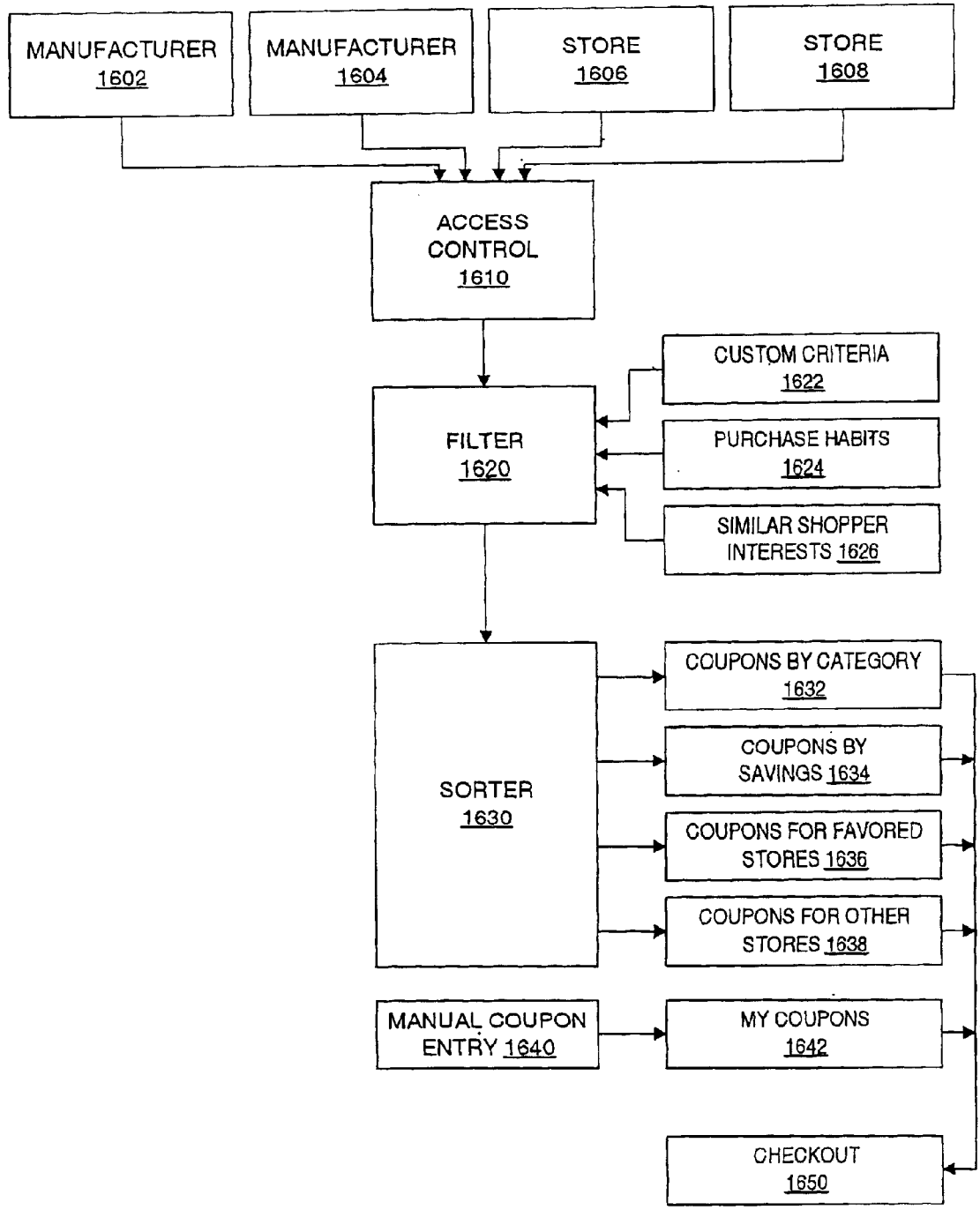
FIG. 16 is a block schematic diagram showing a filtering and sorting process for coupons.

Many different techniques may be used to decide on the various categories of subordinate folders and to place coupons therein. For example, FIG. 16 illustrates one technique in which the user registers with various product vendors, illustratively manufacturers 1602 and 1604 and stores 1606 and 1608. Registration, which preferably is done online, involves soliciting answers to a number of questions about the user's preferences, using techniques well known in the art. The answers are then submitted along with the users imHandle and password to the manufacturer, store, or other commercial concern. As in the case of the airlines, the manufacturers and vendors use the user's imHandle and password to register with the user's My Transactions database. If desired, the user may permit the vendors to create and access particular subordinate folders, as in the case of airlines, but coupons are better handled by providing a degree of filtering. Hence, access preferably is limited to write access and, if desired, retire access by access control 1610 to a filter 1620. The retire access is used by clearinghouse computers to retire single use coupons promptly as they are scanned at the point-of-sale. The filter 1620 receives filter criteria from a number of sources, illustrative from custom user criteria 1622, from the user's purchase habits 1624 which can be tracked from, for example, credit card records or from arrangements with stores (see, e.g., U.S. Pat. No. 5,832,457, issued Nov. 3, 1998 to O'Brien et al. and incorporated herein in its entirety by reference thereto), and from interests expressed by similarly situated shoppers 1626, which is available from various marketing organizations. The coupons that pass through the filter are sorted into categories which the user has determined are useful, illustratively by product category 1632, by amount of savings 1634, by coupons available for use at the user's favorite stores 1636, and by coupons available at stores which compete with those commonly shopped by the user 1638. Additionally, the user may manually enter coupons seen in newspapers, circulars, and so forth by accessing her My Transactions database using her mobile communications device, navigating to the My Coupons subordinate folder (block 1642), and entering the UPC number of the bar code (block 1640). The user may then review her coupons at leisure, and any coupons marked for use are copied or moved—depending on whether use is restricted—into the checkout folder (block 1650). Where the user's My Transactions database is stored on the user's mobile communications device, some of the operations shown in FIG. 16, such as the filter 1620 and the sorter 1630, may have to be simplified or eliminated entirely, depending on the processing and storage capabilities of the mobile communications device.

In order to obtain the user's purchase history, the user must identify himself at the point-of-sale. A well known technique for accomplishing this is by becoming a member of an affinity group. Upon arriving at a checkout counter, the user accesses her My Transactions database, causes the bar coded affinity program ID to be displayed or otherwise communicated with light from the mobile phone, and presents her mobile phone to the store clerk for scanning with a bar code scanner. During the check out process, the user or the store clerk cycles through the bar coded coupons in her Checkout subordinate folder (the cycling may be performed automatically by the mobile communications device at the maximum refresh rate of the scanner if desired) while the store clerk scans them. If the user is a member of many affinity groups, an affinity group category may be established.

The server that hosts the user's My Transactions database or the manufacturer or store wishing to furnish a coupon to the user's My Transactions database locally stored on the user's mobile communication device or remotely stored on a server, may use information about the location of the user's mobile communications device, which is provided by the wireless carriers and available from the wireless ISP, to identify which store the user has entered. The host server or the manufacturer/store server then calls the user and automatically deposits coupons into the appropriate subordinate folder or folders, such as, for example, a "Current" folder or the subordinate folder for the store into which the user has entered, and may if desired automatically display the coupons from the subordinate folder for that store or from any other appropriate subordinate folder. Alternatively, the user may accesses his My Transactions database to select the desired subordinate folder, illustratively the store subordinate folder or the "Current" subordinate folder. The contents of the selected subordinate folder are automatically displayed to the user. The user may select any of the coupons displayed in any manner for the Checkout subordinate folder.

When arrangements are made to travel to a particular location or to attend an event in a particular location, the user may if desired authorize the vendors he is dealing with to deposit coupon and other promotional information which pertains to the location. For example, as shown in FIG. 2, coupons for surface transport, lodging, and restaurant discounts are of interest while traveling, and coupons for like events, memorabilia, and restaurant discounts are of interest while attending a particular event. Coupons in these subordinate folders may be selected and placed in a Checkout subordinate folder for use. Filtering techniques may be applied if desired.

Hotels and car rental companies can use bar coded reservation receipts in many ways. For example, scanners could be installed in airports in place of phones to scan a reservation receipt and automatically dispatch hotel and rental car pickup vans as well as direct the preparation of check-in documents and keys.

Figures 17, 18:
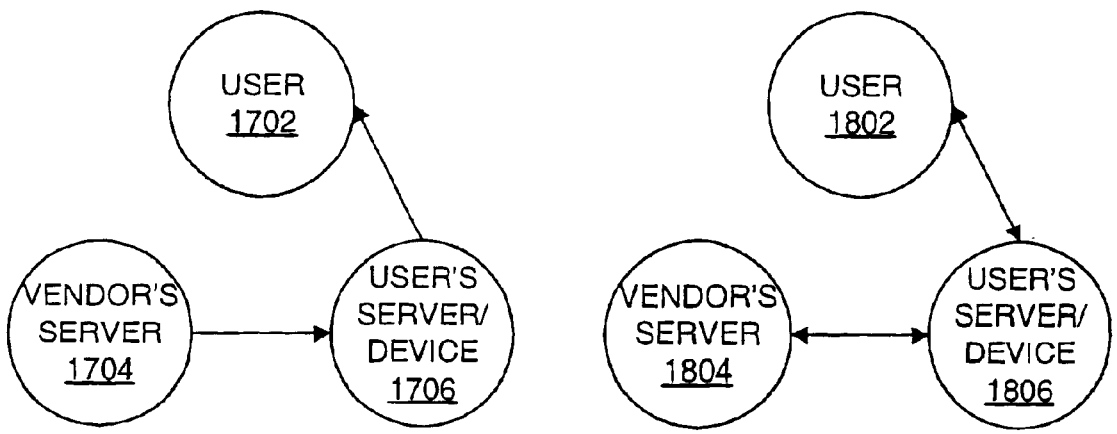
FIGS. 17 and 18 are block schematic diagrams showing different ways of updating information in the My Transactions database.

A variety of techniques may be used to permit the user to modify information stored in the user's My Transactions database. Two illustrative techniques are shown in FIGS. 17 and 18. In FIG. 17, the user 1702 performs the modifications on the vendor's server 1704, and the vendor updates the My Transactions database on the user's server or the user's mobile communications device 1706 to reflect the changes. In FIG. 18, the user 1802 performs the modifications to the My Transactions database on the user's server or the user's mobile communications device 1806, and the user's server or mobile communications device 1806 then synchronizes with the vendor's server 1804.

Figure 19:
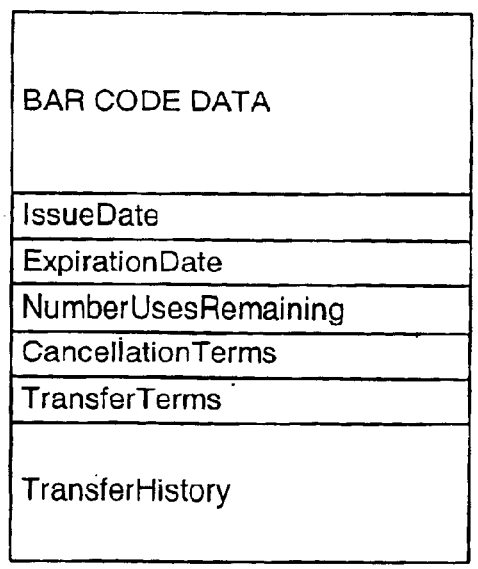
FIG. 19 is a schematic representation of a data structure which includes attributes.

Each file containing bar code data may also contain a number of attributes which are useful for data security, display and maintenance. For instance, the file shown in FIG. 19 is a ticket file that contains in addition to the usual standard data for the bar coded ticket, the ticket issue date, the ticket expiration date, the number of permitted uses, whether the ticket can be cancelled by the vendor and under what terms, whether the ticket can be transferred by the user and under what terms, and a transfer history. One use for these attributes is the periodic maintenance of data on the My Transactions database. For instance, periodically the user's server may check the ExpirationDate and NumberUsesRemaining attributes to determine whether to delete the ticket from the My Transactions database. The user can determine on her mobile communications device whether she can cancel the ticket for a refund or whether she can transfer the ticket by querying the CancellationTerms and TransferTerms attributes.

Figure 20:
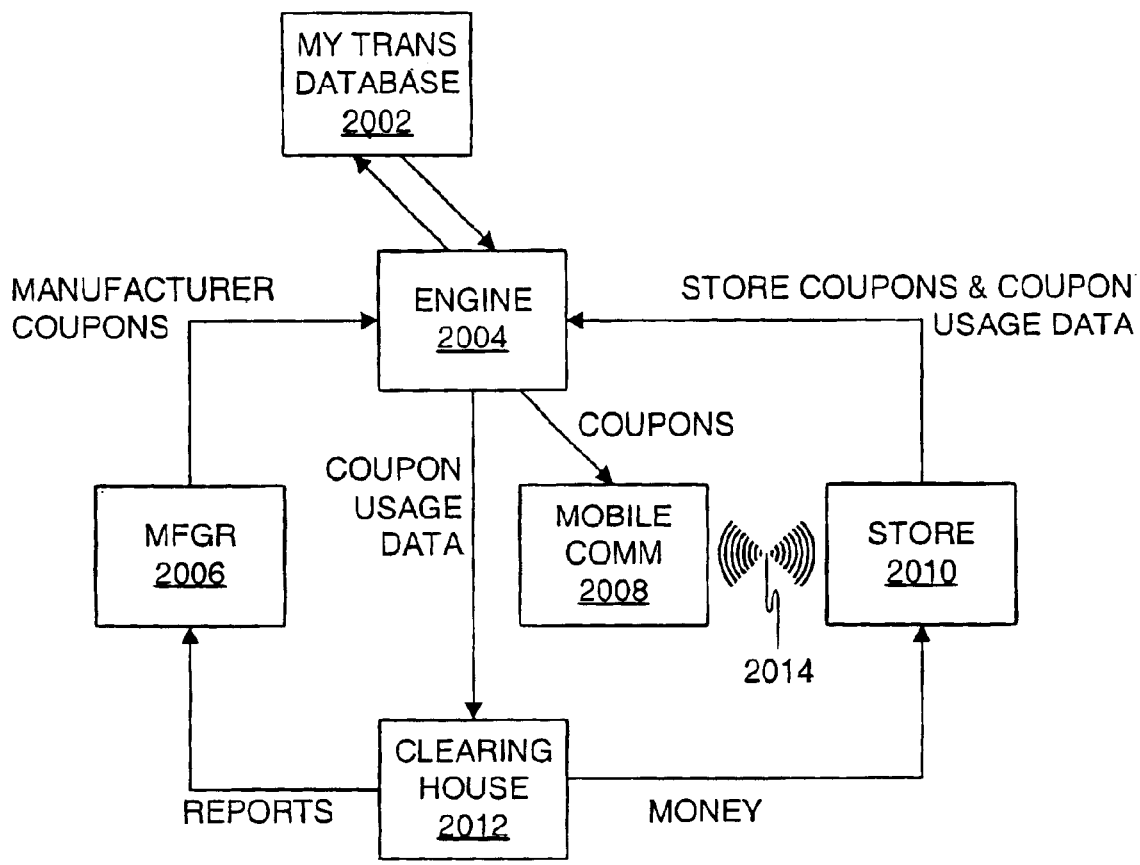
FIG. 20 is a schematic diagram of a coupon processing scheme.

FIG. 20 shows a illustrative coupon processing scheme for a remote My Transactions database. Initially, a manufacturer 2006 and/or a store 2010 issues coupons, which are placed into a My Transaction database 2002 by a delivery engine 2004. The user's mobile communications device 2008 is in wireless communication with the user's My Transactions database via the engine 2004. When a coupon from the My Transactions database 2002 is displayed on or otherwise communicated with light in bar code form with the user's mobile communications device 2008, the store 2010 scans the bar code (as indicated by scanning symbol 2014), processes the bar code scan, and sends information about the scanned coupon (e.g. dollar amount, manufacturer name) and the store ID to the engine 2004. The engine 2004 in turn sends the coupon usage data to a clearinghouse 2012. The clearinghouse 2012 sends money to the store 2010 in any suitable way (physical or electronic) and sends a report to the manufacturer 2006 in any suitable way (physical or electronic).

It will be appreciated that the coupon processing scheme of FIG. 20 may also be carried out with a local My Transactions database, provided that the user's mobile communications device has sufficient processing power and memory to incorporate the My Transactions database 2002.

Figure 21:
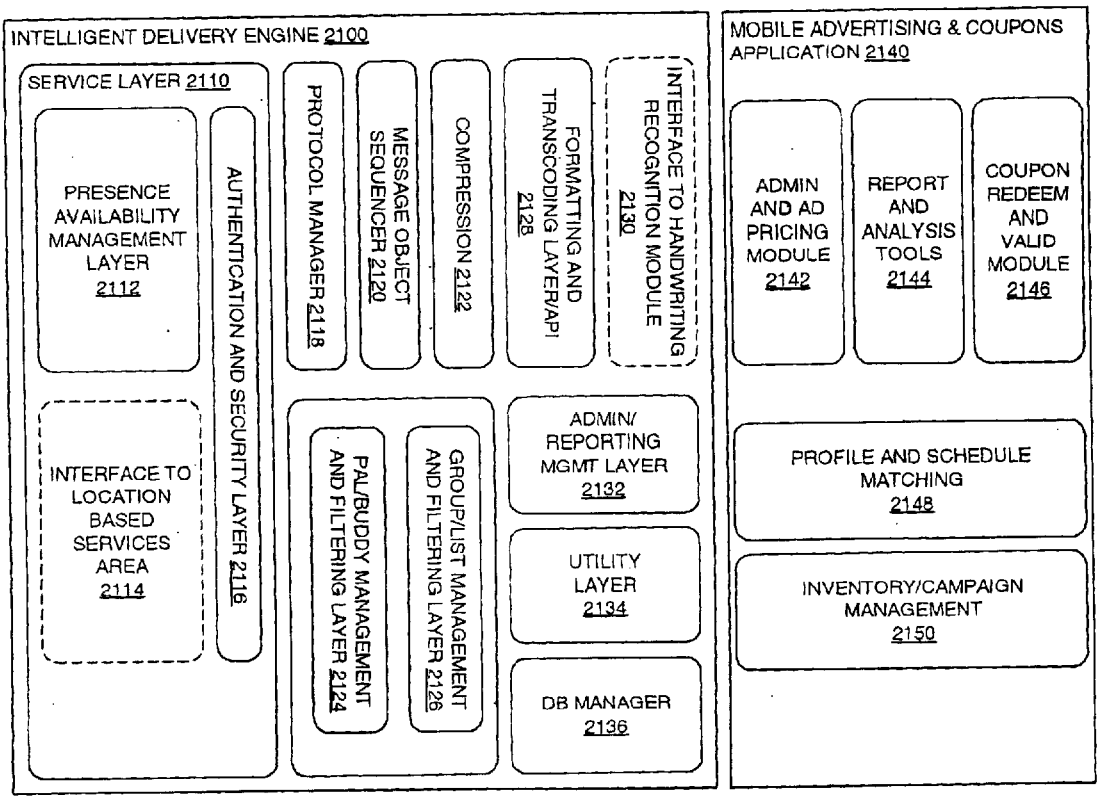
FIG. 21 is a block schematic diagram of the internal architecture of an illustrative intelligent delivery engine suitable for use in the scheme of FIG. 20.

FIG. 21 shows the internal architecture of an illustrative intelligent delivery engine suitable for use in the scheme of FIG. 20, as well as for ticket processing. A service layer 2110 includes a presence availability management layer 2112, an interface to location based services area 2114, and an authentication and security layer 2116. The presence availability management layer 2112 determines how the user is logged in, e.g. through a formal user ID and password login or by having a mobile communications device that is ON and associated with the user. The interface to location based services area 2114 provides an interface to external programs or modules which provide location information about the user. The programs and modules are typically operated by wireless carriers. Users gain access to the services provided by the service layer 2110 through the authentication and security layer 2116, which also functions to block unauthorized access.

The intelligent delivery engine 2100 also provides standard instant messaging functions with a pal/buddy management and filtering layer 2124 and a group/list management and filtering layer 2126. Communications between the user's mobile communications device via a wireless ISP (not shown in FIG. 20) and the intelligent delivery engine 2100 are handled by a protocol manager 2118, a message object sequencer 2120, a compression function 2122, and a formatting and transcoding layer/API 2128. An interface to handwriting recognition module 2130 provides the ability to access external handwriting recognition software for processing handwriting that is digitally captured on such devices as the SmartPad notepad (element 74 in FIG. 1). The My Transactions database is handled by an administration/reporting management layer 2132, a utility layer 2134, and a database manager 2136. The administration/reporting management layer 2132 generates various reports, including reports for the wireless carriers. The utility layer 2134 performs various high level database functions, such as data filtering described previously. The database manager 2136 provides various low level standard database functions.

Mobile advertising and coupons application 2140 performs a number of functions useful in ticketing and coupon transactions. Report and analysis tools 2144 generates various reports for stores, clearinghouses, manufacturers, and the user. Administration and advertisement pricing module 2142 and a coupon redemption and validation module 2146 provide standard functions relating to reporting coupon usage data to clearinghouses. A profile and schedule matching function 2148 generates queries to the My Transactions database based on user profile and user schedule information. The inventory and campaign management function 2150 generates various queries to external databases. For example, the user may request coupons for a desired product, or such requests may be generated automatically from time to time so that coupons may be obtained from vendors which have not registered with and which therefore do not push coupon information to the user's My Transactions database.

Figure 22:
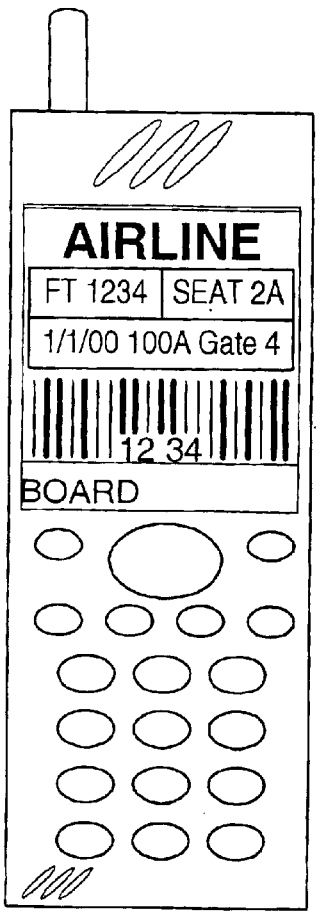
FIG. 22 is a pictorial representation of a mobile boarding pass on a mobile phone having the capability of being retired from the mobile phone.
Figure 23:
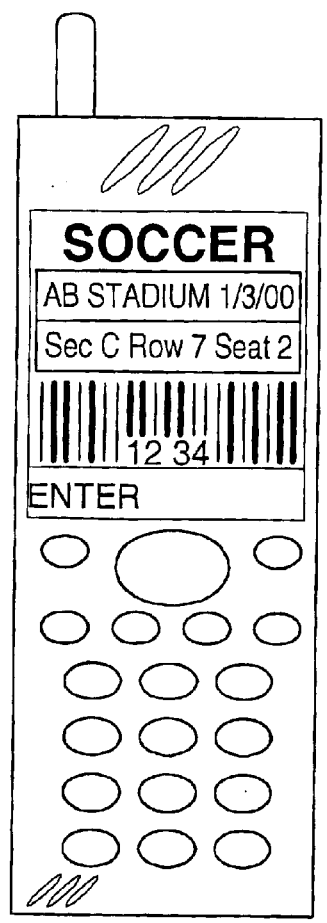
FIG. 23 is a pictorial representation of a soccer sports event mobile ticket on a mobile phone having the capability of being retired from the mobile phone.

In the foregoing description, misuse of documents stored in the user's My Transactions database is minimized by having the issuing entities or their surrogates update their respective mobile documents stored in the user's My Transactions database, including retirement of the documents as appropriate, at the time of the scan so that the mobile documents stored in the user's My Transactions database cannot be misused. However, a misuse issue is also associated with the mobile communications device insofar as the device is able to continue to display or otherwise communicate the bar coded mobile document, either following a dropped connection or by design. For example, a mobile communications device can be designed to maintain an existing displayed image in the event that the user activates certain functions not requiring full screen usage or terminates the wireless connection. Moreover, a mobile communications device may be designed to store the bar coded document locally for later retrieval and communication with light, which is particularly useful if a wireless connection is not available later. If the bar coded mobile document is a limited use document, provision should be made to retire the document after each use so that it must be restored from the updated mobile document in the user's My Transactions database. One technique is to ensure that the mobile communications device cannot continue to communicate the mobile document with light unless it is connected to the My Transactions database. Another technique is for a "retire" button to appear on the display along with information about the bar coded document so that the agent scanning the mobile document can touch the button and retire the bar coded document from the mobile communications device. A suitable display for the airline mobile boarding pass is shown in FIG. 22, wherein the term "Board" appears over the left display-adjacent button which the gate agent presses after scanning the bar coded mobile boarding pass to allow the user to board the aircraft. A suitable display for the sports event mobile ticket is shown in FIG. 23, wherein the term "Enter" appears over the left display-adjacent button which the gate agent presses after scanning the bar coded mobile sports event ticket to allow the user to enter the stadium.

Some issuers of bar coded mobile documents may not wish to manage the updating of the mobile documents in the user's My Transactions database, but may instead wish the server or the mobile communications device managing the user's My Transactions database to also manage the updating and retiring of the mobile documents. In these instances, the bar coded mobile document should be displayed with a retire button such as those shown in FIGS. 22 and 23. The server or mobile communications device managing the user's My Transactions database detects activation of the retire button and performs an appropriate update of the user's My Transactions database. If the issuer of the updated document desires that its own database be updated based on changes to the user's My Transactions database, the server or mobile communications device managing the My Transactions database may synchronize the issuer's database in the manner shown in FIG. 18.

Figure 24:
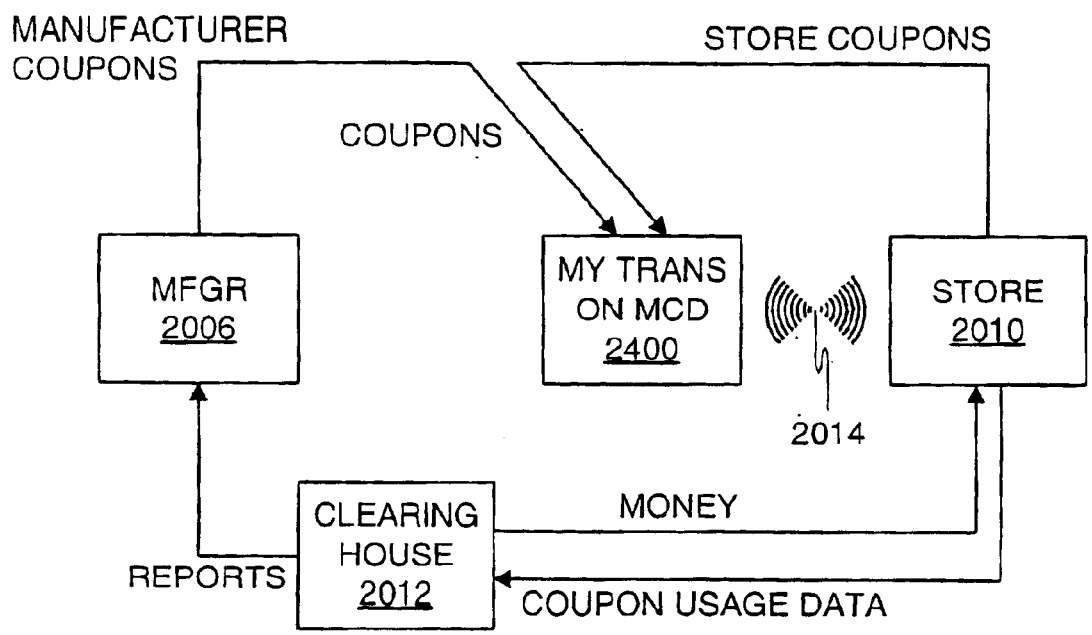
FIG. 24 is a schematic diagram of another coupon processing scheme.

FIG. 24 shows a illustrative coupon processing scheme for a local My Transactions database. Initially, a manufacturer 2006 and/or a store 2010 issues coupons, which are placed by the manufacturer's server and/or the store's server, preferably using push technology, into a My Transaction database stored on the user's mobile communications device 2400. The user's mobile communications device 2400 is in communication with the manufacturer's server and the store's server in any desired manner. For example, the user's mobile communications device may be in wireless communication via the user's wireless ISP. Alternatively, the user's non-mobile device (see, for example, the set top box 82 and the computer/workstation 86 in FIG. 1) may be connected to the Internet to receive the electronic coupons and then download them to the user's mobile communications device. When a coupon from the My Transactions database 2400 is displayed on or otherwise communicated with light in bar code form with the user's mobile communications device, the store 2010 scans the bar code (as indicated by scanning symbol 2014), processes the bar code scan, and sends information about the scanned coupon (e.g. dollar amount, manufacturer name) and the store ID to a clearinghouse 2012. The clearinghouse 2012 sends money to the store 2010 in any suitable way (physical or electronic) and sends a report to the manufacturer 2006 in any suitable way (physical or electronic).

Although the scheme of FIG. 24 is for coupon processing, the scheme is generally applicable with suitable revision for tickets purchased by the user, rights to which the user is entitled, privileges granted to the user by another entity, financial arrangements established by the user, user supplied information useful in a prospective transaction, and so forth.

Figure 25:
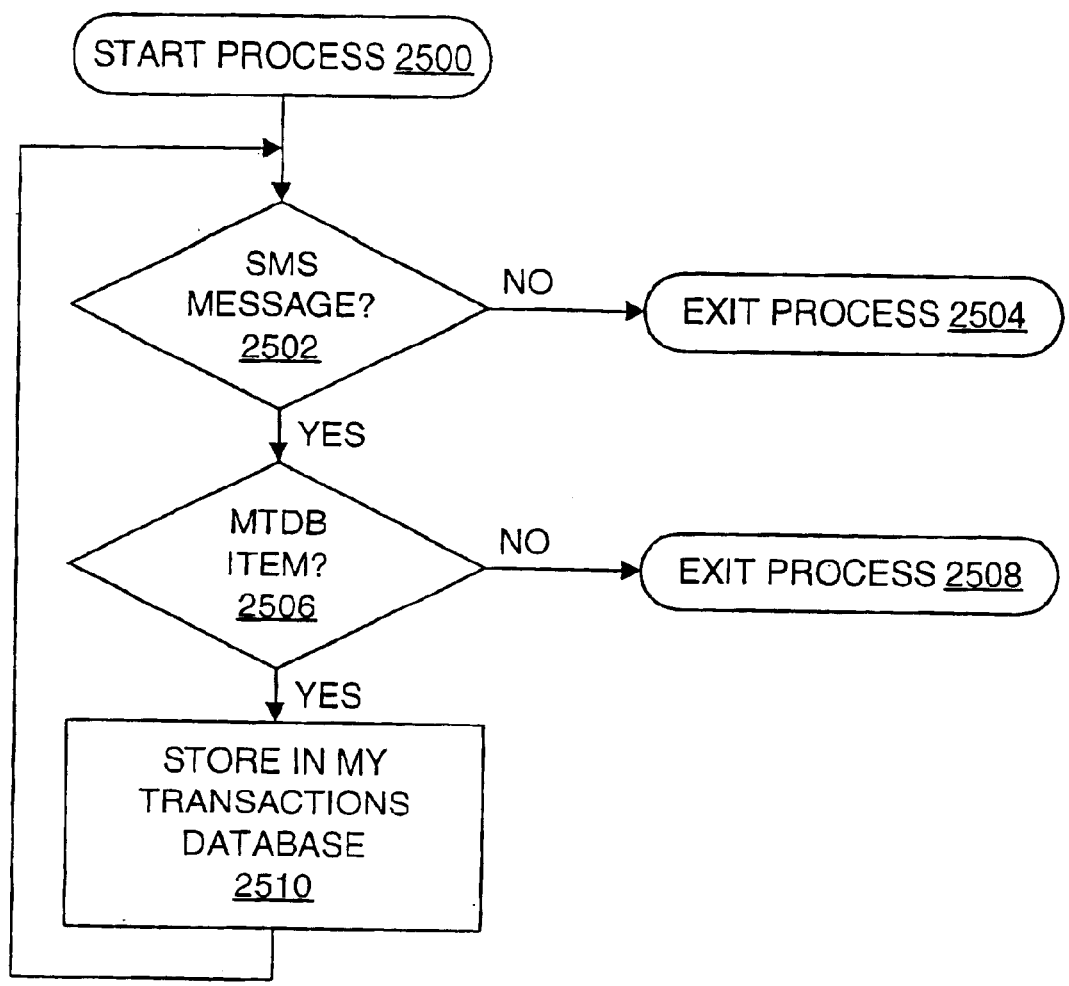
FIG. 25 is a flowchart of a process for storing SMS messages in a My Transactions database.

The user's My Transactions database may be stored and maintained on the user's mobile communications device in a variety of different ways, depending on the processing power, memory, and wireless bandwidth capabilities of the mobile communications device. Even the simplest of mobile communications devices capable of SMS may be used to store and maintain a My Transactions database. An illustrative process for adding options to a local My Transactions database is shown as process 2500 in FIG. 25. The user's mobile communications device checks for an SMS message in block 2502 without displaying the SMS to the user. Generally, the use of SMS to transfer binary data to a mobile communications device which can be interpreted by the mobile communications device without presentation to the user is well known. If an SMS message is detected, the user's mobile communications device then checks to determine whether the SMS message is an item for the My Transactions database ("MTDB") in block 2506. Various techniques may be used to indicate that a particular SMS is an item for the My Transactions database. One illustrative technique involves the use of unique folder codes in predetermined positions in the SMS message. If one of the unique folder codes is detected by the user's mobile communications device (block 2506—yes), the SMS message is stored in the My Transactions database (block 2510). If none is detected (block 2506—no), the SMS message is assumed not to be an item for the My Transactions database, and the process 2500 is exited (block 2508). The SMS messages stored in the My Transactions database on the user's mobile communications device are available for use as described elsewhere in this document.

Due to limited memory of many types of mobile communications device, the size of each SMS item preferably is kept as small as possible. In addition to a field identifying the folder in which the SMS item should be filed, the SMS item includes a field for the information in bar code form and another field, if necessary, for information for viewing by the user. The information in bar code form often is no longer than a short string of numbers representing an index value, although it can be much more lengthy if representing actual data. The user information can be quite lengthy, but preferably is limited to essential user information when SMS is used.

Figure 26:
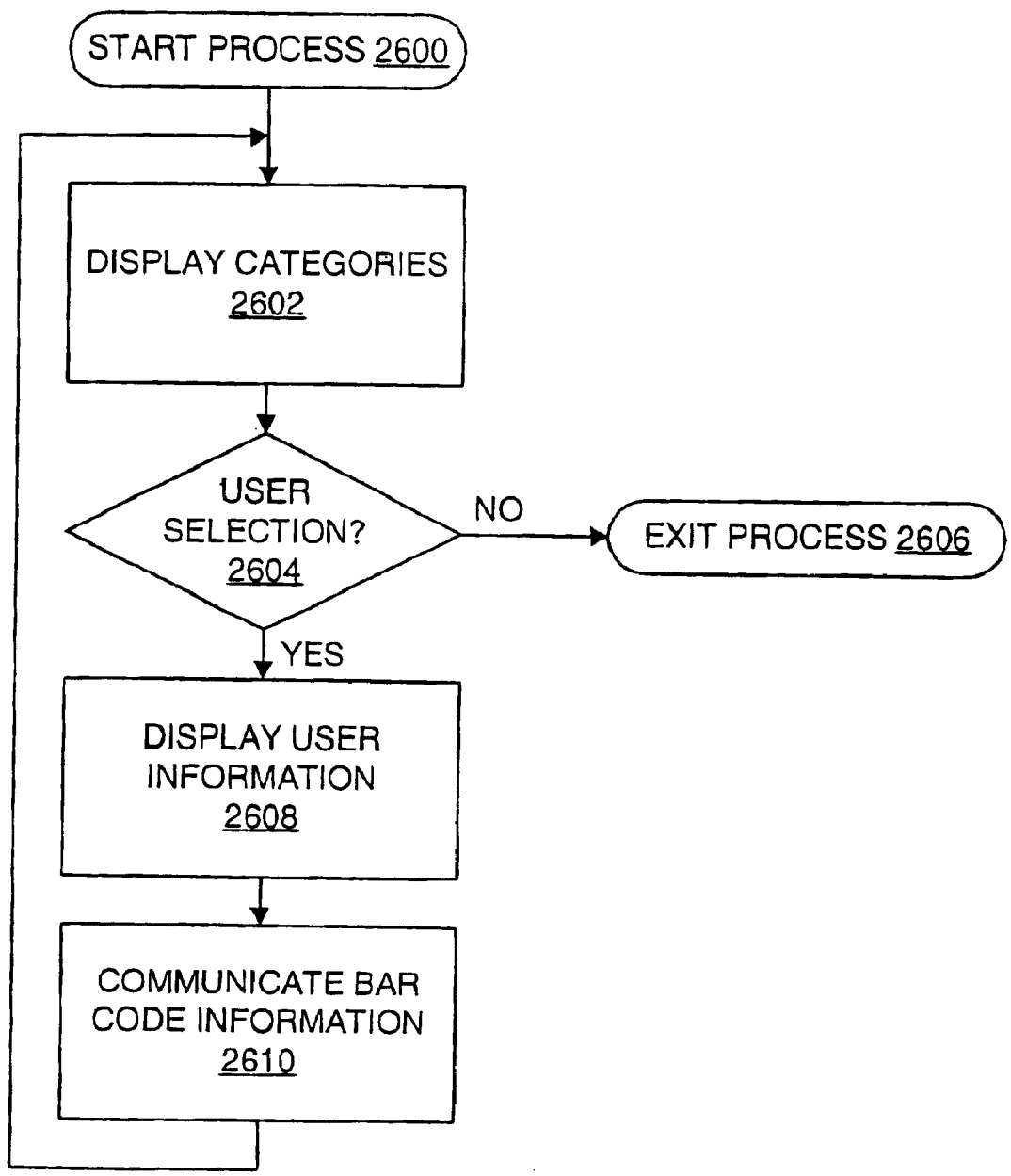
FIG. 26 is a flowchart of a process for selecting and communicating information in bar code form with a mobile communications device.

FIG. 26 shows an illustrative process 2600 for a user to access specific items of information in a My Transactions database located on the user's mobile communications device. The My Transactions database contains diverse categories of information relating to the user. Because of the limited bandwidth available for SMS, preferably category information is preprogrammed into the user's mobile communications device and stored into local memory. The user navigates through one or more category levels to reach the folder (principal or subordinate) that contains the specific item of information that is desired (block 2602). The user then opens the folder containing the specific item of information desired and selects the specific item of information (block 2604—yes). When the specific item of information is selected, information of interest to the user about the specific item is displayed on the screen of the user's mobile communications device (block 2608), and the user's mobile communications device begins to communicate the appropriate information in bar code form on the display or otherwise with light (block 2610).

Figure 27:
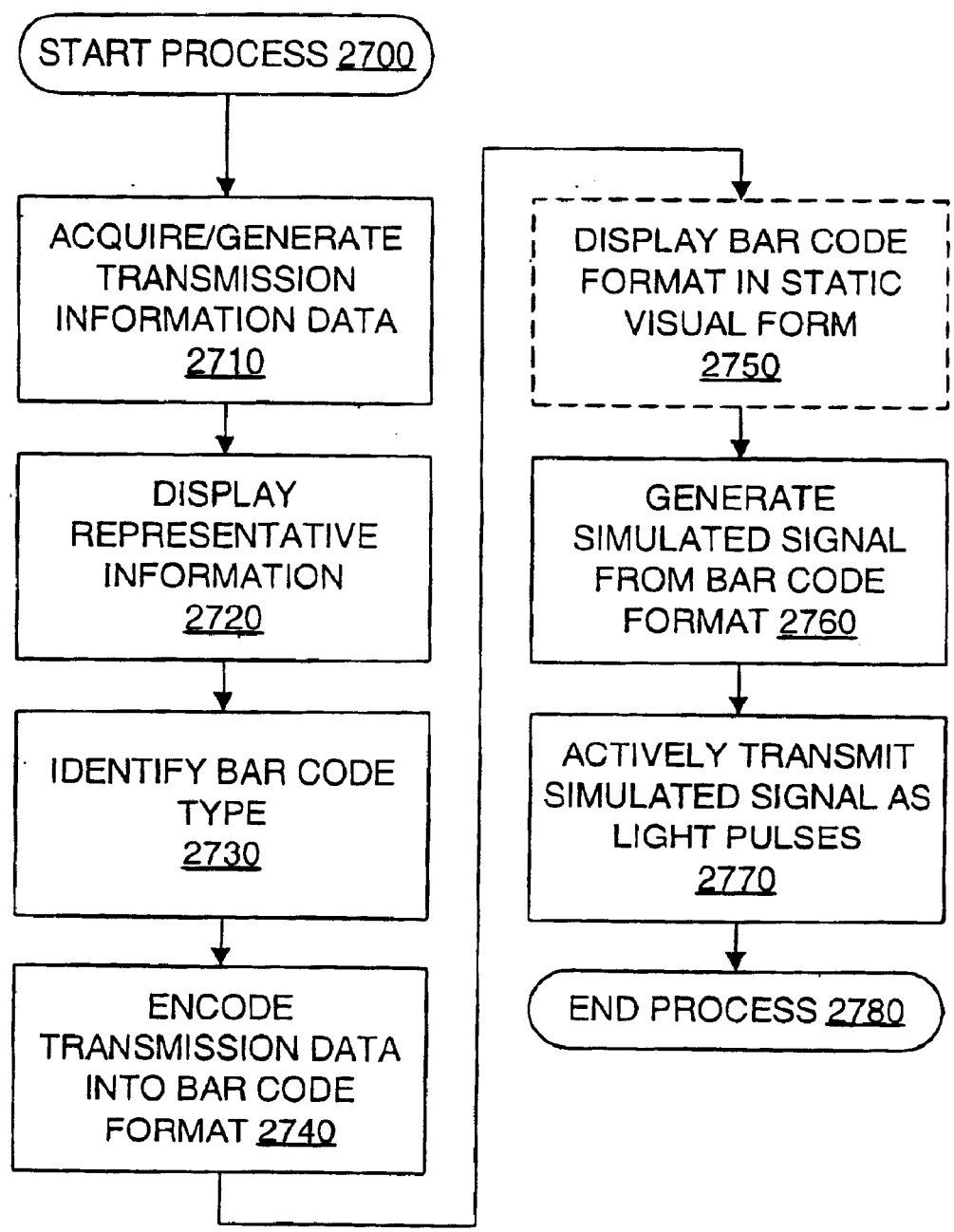
FIG. 27 is a flowchart of a process for actively transmitting information in bar code form with light pulses from a mobile communications device.

FIG. 27 shows an illustrative process 2700 for generating a signal for use with a sequential bar code scanner that simulates a bar code with light pulses. The method of FIG. 27 is particularly useful for sequential bar code scanners that use the reflection of a scanning beam being moved over a bar code.

In block 2710, transmission information data is acquired or generated. The transmission information data may be any type of data that one may wish to communicate while at a facility equipped with a bar code scanner, including information conventionally communicated using bar codes, as well as other types of information that are not conventionally communicated using bar codes because of, for example, physical limitations imposed by the bar code format. The transmission information data may include, for example, numeric, alphabetic, or alphanumeric data, an index, or other data values. The transmission information data may represent, for example, boarding pass information, e-ticket information, ticket information, credit card information, debit card information, automated teller machine card information, identification information, account information, electronic payment information, wire transfer information, purchase information, security information, affinity information, and so forth. The transmission information data may be stored locally on the mobile communications device, or acquired from a remote source. The transmission information data may be programmed into the device, entered into the device by the user, or received by the device from any type of remote source over any type of communication technology, wireless or wired.

In block 2720, representative information for the transmission information data that will identify the transmission information data to a user of the mobile communications device may if desired be presented on an output facility of the device. The output facility may include, for example, a display such as an LCD screen of a PDA or wireless telephone, a speaker, or any other output device for communicating with a user. The representative information may include the transmission information data itself, or may be other information that the user will associate with the transmission information data. An example of representative information is boarding pass information identifying the airline, the flight and seat numbers, the date and departure time of the flight, and the gate number.

In block 2730, a bar code type is identified. The bar code type may be any type of barcode, including such well known types as a UPC, EAN, Interleaved 2 of 5, Code 93, Code 128, and Code 39, and specially designed bar code types.

In block 2740, the transmission information data is encoded into a bar code form or format for the identified bar code type. The bar code format may be represented, for example, by a binary array, a two-dimensional array such as a bit map, a digital series encoding, or other formats. The format may also be compressed or encrypted.

Optionally, the transmission information data may also be displayed in a static visual format as well as being encoded in a bar code format, such as shown in block 2750. In this manner, the mobile communications device can actively provide the transmission information data to some bar code scanners such as sequential bar code scanners, and can also statically provide the transmission information data to other bar code scanners such as charge coupled device ("CCD") scanners.

In block 2760, a signal to simulate the reflection of a scanning beam being moved across a visual image of the bar code format of block 2740 is generated from the bar code format. The simulated signal may be generated corresponding to an approximated or measured scanning rate.

In block 2770, the simulated signal is transmitted as light pulses.

As mobile communications devices evolve to incorporate new communications protocols and technologies, the user may use either the new protocols and technologies, or the communication of information in bar code form with light from his mobile communications device at the point-of-sale, depending on the capabilities of the point-of-sale. An example of a proposed digital payment system based on infrared communications technology is infrared financial messaging ("IrFM"); see, e.g., H. R. Damon Gonzalez, Jr., Ronald J. Brown, and Lawrence Faulkner, Creating an End-to-End Digital Payment System, Oct. 15, 1999. If the user's mobile communications device is enabled for IrFM but the point-of-sale is not, the user may instead communicate his financial information in bar code form with light from his mobile communications device since the point-of-sale is likely to have a bar code scanner.

The scope of our invention is set forth in the following claims. The description of the various embodiments set forth herein is illustrative of our invention and is not intended to limit the scope thereof, as variations/modifications are possible. Alternatives and equivalents of the various elements of the embodiments may be apparent from this description. These and other variations and modifications of the embodiments disclosed herein may be made without departing from the scope and spirit of the invention as set forth in the claims.

What is claimed is:

1. A method of communicating information in bar code form with a mobile communications device having an input capability for a user thereof, comprising:
    making available to the user by the mobile communications device first information about diverse categories of information relating to the user;
    identifying at least one of the diverse information categories, with user input from the user input capability of the mobile communications device in response to the step of making available first information;
    obtaining by the mobile communications device second information relating to the identified category; and
    communicating the second information at least in part in bar code form with light from the mobile communications device.

2. The method of claim 1 wherein the obtaining step comprises:
    making available to the user by the mobile communications device option information about various options for the user that relate to the identified category; and
    identifying at least one of the options with user input from the user input capability of the mobile communications device in response to the step of making available option information;
    the second information relating directly to the identified option and indirectly to the identified category.

3. The method of claim 2 wherein:
the step of making available first information comprises communicating through the mobile communications device to make available the first information from a remote database;
the step of making available option information comprises communicating through the mobile communications device to make available the option information from a remote database; and
the step of obtaining second information comprises communicating through the mobile communications device to receive the second information from a remote database.

4. The method of claim 3 wherein the steps of communicating to make available the first information, communicating to make available the option information, and communicating to receive the second information comprise wireless transmissions to and from the mobile communications device.

5. The method of claim 3 wherein:
the step of making available first information is performed at least in part using pull technology;
the step of making available option information is performed at least in part using pull technology; and
the step of obtaining second information is performed at least in part using pull technology.

6. The method of claim 2 wherein:
the step of making available first information comprises making available the first information from a database stored on the mobile communications device;
the step of making available option information comprises making available the option information from the database stored on the mobile communications device; and
the step of obtaining second information comprises communicating through the mobile communications device to receive the second information from a remote database.

7. The method of claim 6 wherein the step of communicating to receive the second information comprise wireless transmissions to and from the mobile communications device.

8. The method of claim 6 further comprising:
placing the first information into the database stored on the mobile communications device at least in part using pull technology; and
placing the option information into the database stored on the mobile communications device at least in part using pull technology;
wherein the step of obtaining second information is performed at least in part using pull technology.

9. The method of claim 6 further comprising:
placing the first information into the database stored on the mobile communications device at least in part using push technology; and
placing the option information into the database stored on the mobile communications device at least in part using push technology;
wherein the step of obtaining second information is performed at least in part using pull technology.

10. The method of claim 2 wherein:
the step of making available first information comprises making available the first information from a database stored on the mobile communications device;
the step of making available option information comprises making available the option information from the database stored on the mobile communications device; and
the step of obtaining second information comprises obtaining the second information from the database stored on the mobile communications device.

11. The method of claim 10 further comprising:
placing the first information into the database stored on the mobile communications device at least in part using pull technology;
placing the option information into the database stored on the mobile communications device at least in part using pull technology; and
placing the second information into the database stored on the mobile communications device at least in part using pull technology.

12. The method of claim 10 further comprising:
placing the first information into the database stored on the mobile communications device at least in part using push technology;
placing the option information into the database stored on the mobile communications device at least in part using push technology; and
placing the second information into the database stored on the mobile communications device at least in part using push technology.

13. The method of claim 1 wherein the second information relates directly to the identified category.

14. The method of claim 13 wherein:
the step of making available first information comprises communicating through the mobile communications device to make available the first information from a remote database; and
the step of obtaining second information comprises communicating through the mobile communications device to receive the second information from a remote database.

15. The method of claim 14 wherein the steps of communicating to make available the first information and communicating to receive the second information comprise wireless transmissions to and from the mobile communications device.

16. The method of claim 14 wherein:
the step of making available first information is performed at least in part using pull technology; and
the step of obtaining second information is performed at least in part using pull technology.

17. The method of claim 13 wherein:
the step of making available first information comprises making available the first information from a database stored on the mobile communications device; and
the step of obtaining second information comprises communicating through the mobile communications device to receive the second information from a remote database.

18. The method of claim 17 wherein the step of communicating to receive the second information comprise wireless transmissions to and from the mobile communications device.

19. The method of claim 17:
further comprising placing the first information into the database stored on the mobile communications device at least in part using pull technology;
wherein the step of obtaining an information item is performed at least in part using pull technology.

20. The method of claim 17:
further comprising placing the first information into the database stored on the mobile communications device at least in part using push technology;

wherein the step of obtaining an information item is performed at least in part using pull technology.

21. The method of claim 13 wherein:
the step of making available first information comprises making available the first information from a database stored on the mobile communications device; and
the step of obtaining second information comprises obtaining the second information from a database stored on the mobile communications device.

22. The method of claim 21 further comprising:
placing the first information into the database stored on the mobile communications device at least in part using pull technology; and
placing the second information into the database stored on the mobile communications device at least in part using pull technology.

23. The method of claim 21 further comprising:
placing the first information into the database stored on the mobile communications device at least in part using push technology; and
placing the second information into the database stored on the mobile communications device at least in part using push technology.

24. The method of claim 1 wherein the mobile communications device further has an information display capability for the user, further comprising displaying the second information at least in part in user-readable form by use of the information display capability of the mobile communications device.

25. The method of claim 1 further comprising, prior to the first information making available step, preprogramming the first information into the mobile communications device.

26. The method of claim 1 further comprising:
preprogramming the first information into the mobile communications device prior to the first information making available step; and
placing the second information into a database stored on the mobile communications device at least in part using push technology, prior to the second information obtaining step.

27. The method of claim 26 wherein the push technology for the second information placing step comprises SMS messaging.

28. The method of claim 26 wherein the push technology for the second information placing step comprises WAP technology.

29. The method of claim 1 further comprising placing the second information into a database stored on the mobile communications device at least in part using pull technology, prior to the second information obtaining step.

30. The method of claim 29 wherein the pull technology for the second information placing step comprises WAP technology.

31. The method of claim 1 wherein the communicating step is performed by static light communications.

32. The method of claim 1 wherein the communicating step is performed by active light communications.

33. The method of claim 1 further comprising directing the light resulting from the step of communicating the second information with light to a bar code scanner.

34. The method of claim 1 wherein the step of making available first information and the step of obtaining second information are performed wirelessly.

35. The method of claim 1 wherein the step of making available first information is performed at least in part with push or pull technology, and the step of obtaining second information is performed at least in part with push or pull technology.

36. The method of claim 1 wherein the second information communicating step is performed by static light communications.

37. The method of claim 1 wherein the second information communicating step is performed by active light communications.

38. The method of claim 1 wherein the information category identified in the information category identifying step is an airline category and the second information comprises a boarding pass, further comprising presenting the boarding pass as communicated in the second information communicating step to a bar code scanner to board an aircraft.

39. The method of claim 1 further comprising presenting the light from the second information communicating step to a bar code scanner.

40. The method of claim 1 wherein the diverse information categories comprise tickets.

41. The method of claim 1 wherein the diverse information categories comprise coupons.

42. The method of claim 1 wherein the diverse information categories comprise rights and privileges.

43. The method of claim 1 wherein the diverse information categories comprise user supplied information.

44. The method of claim 1 wherein the first information is stored on at least one server, further comprising accessing the server through a wireless service provider, and wherein the first information making available step comprises wirelessly accessing the wireless service provider from the mobile communications device.

45. The method of claim 44 wherein the wireless service provider has an Internet connection, and the server accessing step comprises accessing the server from the wireless service provider over the Internet.

46. The method of claim 44 wherein the wireless service provider is a wireless application service provider.

47. The method of claim 44 wherein the wireless service provider is a wireless operator.

48. The method of claim 44 wherein the wireless service provider is a portal.

49. The method of claim 1 wherein the mobile communications device further has an information display capability and wherein the information category identifying step comprises:
displaying a view of the diverse information categories by use of the information display capability of the mobile communications device; and
selecting one of the diverse information categories displayed in the view displaying step in response to the user input capability of the mobile communications device.

50. The method of claim 49 wherein the view displaying step comprises displaying on the display screen a plurality of top level folders from the user's database.

51. The method of claim 49 wherein the view displaying step comprises displaying on the display screen a plurality of subordinate level folders from the user's database.

52. The method of claim 49 wherein the view displaying step comprises displaying on the display screen a plurality of options from the user's database.

53. The method of claim 49 wherein the view displaying step comprises:
displaying on the display screen a plurality of top level folders from the user's database;
selecting one of the top level folders displayed in the top level folder displaying step in response to the user input capability of the mobile communications device;

displaying on the display screen a plurality of subordinate level folders corresponding to the top level folder selected in the top level folder selecting step;

selecting one of the subordinate level folders displayed in the subordinate level folder displaying step in response to the user input capability of the mobile communications device; and displaying on the display screen a plurality of options corresponding to the subordinate level folder selected in the subordinate level folder selecting step.

54. The method of claim 49 wherein:

the mobile communications device comprises a display screen and a keypad;

the view displaying step comprises:
   displaying on the display screen a plurality of folders from the user's database;
   detecting a pressed key of the keypad to select a folder from the plurality of folders displayed in the folder displaying step;
   opening the selected folder from the key touching step to display a plurality of options;
   detecting a pressed key of the keypad to select an option from the plurality of options displayed in the folder opening step; and the second information obtaining step comprises obtaining the second information in response to the option selection.

55. The method of claim 49 wherein:

the mobile communications device comprises a display screen and a stylus;

the view displaying step comprises:
   displaying on the display screen a plurality of folders from the user's database;
   detecting a touching of the display screen by the stylus to select a folder from the plurality of folders displayed in the folder displaying step;
   opening the selected folder from the screen touching step to display a plurality of options; and
   detecting a touching of the display screen by the stylus to select an option from the plurality of options displayed in the folder opening step; and the second information obtaining step comprises obtaining the second information in response to the option selection.

56. The method of claim 1 wherein:

the mobile communications device comprises an ear piece and a mouthpiece;

the information category identifying step comprises:
   articulating in the ear piece a plurality of folders for the diverse information categories from the user's database;
   detecting a first spoken command at the mouthpiece to select a folder from the plurality of folders articulated in the folder articulation step;
   opening the folder selected in the first spoken command detecting step to articulate in the ear piece a plurality of options; and
   detecting a second spoken command at the mouthpiece to select an option from the plurality of options articulated in the folder opening step; and the second information obtaining comprises obtaining the second information in response to the option selection.

57. The method of claim 1 wherein the information category identified in the information category identifying step is an airline category and the information communicated in the second information communicating step is a flight coupon, further comprising:

presenting the flight coupon as communicated in the second information communicating step to a bar code scanner to wirelessly acquire a boarding pass with the mobile communications device;

communicating the boarding pass at least in part in bar code form with light from the mobile communications device; and presenting the boarding pass as communicated in the boarding pass communicating step to a bar code scanner to board an aircraft.

58. The method of claim 1 wherein the information category identified in the information category identifying step is an event category and the information communicated in the second information communicating step is a ticket to an event, further comprising presenting the ticket as communicated in the second information communicating step to a bar code scanner to enter the event.

59. The method of claim 58 further comprising:

exiting the event;

wirelessly acquiring a ticket stub with the mobile communications device, in response to the ticket presenting step;

communicating the ticket stub at least in part in bar code form with light from the mobile communications device; and presenting the ticket stub as communicated in the ticket stub communicating step to a bar code scanner to reenter the event.

60. The method of claim 1 wherein the second information is an electronic ticket, further comprising:

purchasing the electronic ticket; and adding the electronic ticket to one of the categories of information.

61. The method of claim 1 wherein the second information is an electronic license, further comprising:

applying for the electronic license; and adding the electronic license to one of the categories of information.

62. The method of claim 1 wherein the second information is an electronic security pass, further comprising:

applying for the electronic security pass; and adding the electronic security pass to one of the categories of information.

63. The method of claim 1 wherein the second information is prospective transaction information, further comprising the user executed steps of:

establishing the prospective transaction information; and adding the prospective transaction information to one of the categories of information.

64. The method of claim 1 wherein the second information is from an entity other than the user, further comprising, prior to the second information communicating step:

making available to the entity access to at least one of the diverse information categories; and augmenting at least one of the diverse information categories with the second information, the second information being from the entity as a result of the making available step.

65. The method of claim 64 wherein:

the diverse information categories are represented by a plurality of folders;

the entity making available step further comprises:

receiving a request from the entity to establish a new folder;

establishing the new folder with access restrictions appropriate for the entity; and opening the folder to the entity upon the entity's compliance with the access restrictions; and the augmenting step further comprises receiving the information from the entity in the new folder.

66. The method of claim 65 wherein the second information acquiring step comprises:

receiving a request from the mobile communications device to read the second information from the new folder; and furnishing the second information to the mobile communications device from the new folder.

67. The method of claim 65 wherein the plurality of folders comprises a plurality of top level folders and a plurality of subordinate folders, at least some of the top level folders including more than one of the subordinate folders.

68. The method of claim 64 wherein:

the diverse information categories are represented by a plurality of folders;

the entity making available step further comprises:

receiving a request from the entity to access a selected one of the folders, the selected folder having access restrictions appropriate for the entity; and opening the selected folder to the entity upon the entity's compliance with the access restrictions; and the augmenting step further comprises receiving the information from the entity in the selected folder.

69. The method of claim 68 wherein the information is established by updating previous information in the selected folder.

70. The method of claim 68 wherein the information is established by placing new information in the selected folder.

71. The method of claim 68 wherein the second information acquiring step comprises:

receiving a request from the mobile communications device to read the second information from the selected folder; and furnishing the second information to the mobile communications device from the selected folder.

72. The method of claim 68 wherein the plurality of folders comprises a plurality of top level folders and a plurality of subordinate folders, at least some of the top level folders including more than one of the subordinate folders.

73. The method of claim 1 further comprising, prior to the second information communicating step:

receiving a request from the mobile communications device to modify or create an element of the diverse information categories to establish the second information; and electronically synchronizing records of an entity other than the user with the second information.

74. The method of claim 1 further comprising, prior to the second information communicating step:

furnishing a request from the mobile communications device to an entity other than the user to modify or create an element of the diverse transactional information to establish the second information; and receiving additional information from the third party to establish the second information in accordance with the request from the mobile communications device.

75. A method of communicating information in bar code form with a mobile communications device having input capability and an information display capability for the user thereof, comprising:

making available to the user by the mobile communications device descriptive information about diverse categories of information relating to the user, the descriptive information being organized under category headings;

identifying at least one of the diverse information categories with user input from the user input capability of the mobile communications device in response to the step of making available descriptive information;

making available to the user by the mobile communications device option information about various options for the user that relate to the identified category;

identifying at least one of the options with user input from the user input capability of the mobile communications device in response to the step of making available option information;

obtaining by the mobile communications device an item of information relating to the identified option;

displaying the information item at least in part in user-readable form by use of the information display capability of the mobile communications device; and communicating the information item at least in part in bar code form with light from the mobile communications device.

76. The method of claim 75 further comprising:

preprogramming the descriptive information on the mobile communications device prior to the descriptive information making available step;

preprogramming the options information on the mobile communications device prior to the option information making available step; and placing the information item into a database stored on the mobile communications device prior to the information item obtaining step.

77. The method of claim 76 wherein the information item placing step comprises SMS messaging.

78. The method of claim 76 wherein the information item placing step comprises synchronizing the mobile communications device with a non-mobile device.

79. A method of communicating information to a mobile communications device, the mobile communications device having user input and information display capabilities and the communicated information being suitable for display in bar code form by use of the information display capability of the mobile communications device, the method comprising:

furnishing for the mobile communications device first information about diverse categories of information relating to a user of the mobile communications device;

receiving an identification of at least one of the diverse information categories made by the user input capability of the mobile communications device; and furnishing for the mobile communications device, in response to the receiving step, second information from the identified information category, the second information being furnished in a form suitable for wireless transmission to the mobile communications device and at least part of the second information being furnished in a form suitable for display in bar code form by use of the information display capability of the mobile communications device.

80. The method of claim 79 further comprising receiving from the mobile communications device a request for the first information, wherein the first information furnishing step comprises furnishing the first information in a form suitable for wireless transmission to the mobile communications device, in response to the first information request.

81. The method of claim 79 further comprising:
storing the first information on at least one server;
accessing the server from a wireless service provider; and
receiving a request for the first information from the mobile communications device;
wherein the first information furnishing step comprises furnishing the first information from the server to the wireless service provider in a form suitable for wireless transmission to the mobile communications device, in response to the first information request.

82. The method of claim 79 wherein the second information is from an entity other than the user, further comprising, prior to the second information furnishing step:
making available to the entity access to at least one of the diverse information categories; and
augmenting at least one of the diverse information categories with the second information, the second information being from the entity as a result of the making available step.

83. The method of claim 79 further comprising, prior to the second information displaying step:
receiving a request from the mobile communications device to modify or create an element of the diverse information categories to establish the second information; and
electronically synchronizing records of an entity other than the user with the second information.

84. The method of claim 79 further comprising, prior to the second information displaying step:
furnishing a request from the mobile communications device to an entity other than the user to modify or create an element of the diverse transactional information to establish the second information; and
receiving additional information from the third party to establish the second information in accordance with the request from the mobile communications device.

85. A computer-implemented method of employing one or more computers to enable a mobile communications device having user input and information display capabilities to communicate information in bar code form, the one or more computers having access to a network that includes a wireless link for wirelessly communicating with the mobile communications device, the method comprising:
receiving from the mobile communications device via the network a request for first information about diverse categories of information relating to a user of the mobile communications device;
furnishing the first information to the mobile communications device via the network;
receiving from the mobile communications device via the network an identification of at least one of the diverse information categories contained in the first information furnished to the mobile communications device in the first information furnishing step, the identification being in response to the user input capability of the mobile communications device; and
furnishing to the mobile communications device via the network second information from the identified information category, in response to the information category identifying step, the second information comprising a component to enable the mobile communications device to display at least part of the second information in bar code form by use of the information display capability of the mobile communications device.

86. The method of claim 85 further comprising storing the first information in a database, wherein the first information furnishing step comprises furnishing the first information to the mobile communications device from the database.

87. The method of claim 85 further comprising storing the second information in a database accessible to a plurality of computers over a network, wherein the second information furnishing step comprises furnishing the second information from the database.

88. The method of claim 87 wherein the network is the Internet.

89. The method of claim 87 wherein the second information is at least in part from an entity other than the user, further comprising, prior to the second information furnishing step:
making available to the entity access to the database; and
adding the second information to the database under at least one of the diverse information categories, the second information being from the entity as a result of the making available step.

90. The method of claim 85 further comprising, prior to the request receiving step:
receiving from the mobile communications device via the network a request to modify or create an element of the diverse information categories for establishing the second information; and
electronically synchronizing information from an entity other than the user with the element to establish the second information.

91. The method of claim 85 further comprising, prior to the request receiving step:
receiving from an entity other than the user a request to modify or create an element of the diverse transactional information for establishing the second information; and
receiving additional information from the entity to establish the second information in accordance with the request from the mobile communications device.

92. The method of claim 85 wherein at least one of the diverse information categories is a ticket, coupon, rights and privileges, or user supplied information category.

93. The method of claim 85 wherein the request is a home account access.

94. The method of claim 85 wherein the request is a request to list categories under a category heading.

95. A method of controlling entry to a facility, comprising:
furnishing to the mobile communications device first information about diverse categories of information relating to a user of the mobile communications device, the categories of information including a ticket-related category;
receiving an identification of the ticket-related category from the user input capability of the mobile communications device; and
wirelessly furnishing to the mobile communications device, in response to the receiving step, ticket information from the ticket-related category, at least part of the ticket information being furnished in a form suitable for display in bar code form by use of the information display capability of the mobile communications device.

96. The method of claim 95 further comprising:

communicating at least part of the ticket information in bar code form with light from the mobile communications device;

directing the light from the communicating step to a bar code scanner;

scanning the light from the communicating step with the bar code scanner; and determining whether to permit entry to the facility as a result of the scanning step.

97. The method of claim 95 wherein:

the ticket information is a ticket to a sports event occurring at an arena; and the bar code scanner is disposed at an entrance gate to the arena.

98. The method of claim 95 wherein:

the ticket information is an airline flight coupon; and the bar code scanner is disposed at a check-in counter at an airport.

99. The method of claim 95 wherein:

the ticket information is an airline boarding pass; and the bar code scanner is disposed at a boarding area to an airplane.

100. The method of claim 95 further comprising, following the ticket information furnishing step:

receiving an indication that the ticket information has been scanned by a bar code scanner; and augmenting the ticket-related category to indicate use of the ticket information for entry to the facility.

101. The method of claim 95 wherein the ticket information provides for plural access to the facility, further comprising, following the ticket information furnishing step:

receiving an indication that the ticket information has been scanned by a bar code scanner;

augmenting the ticket-related category to indicate cancellation of the ticket; and augmenting the ticket related category with a receipt to allow entry to the facility.

102. The method of claim 101 wherein the receipt is an electronic form of an airline boarding pass.

103. The method of claim 101 wherein the receipt is an electronic form of an event ticket stub.

104. A method of communicating information in bar code form with a mobile communications device having user input and information display capabilities, comprising:

making available electronic access to diverse transactional information relating to a user of the mobile communications device, the transactional information being stored in a first non-transient memory comprising electronic memory of at least one computer system;

identifying at least one transaction category in response to the user input capability of the mobile communications device;

furnishing to the mobile communications device first information for the identified transaction category from the diverse transactional information stored in the first non-transient memory, at least part of the first information being furnished in a form suitable for communication in bar code form with light from the mobile communications device;

receiving a communication with light from the mobile communications device of at least part of the first information in bar code form, with a bar code scanner; and processing the part of the first information obtained in the receiving step to obtain second information about use of the first information by the user, the second information being stored in a second non-transient memory comprising electronic memory of at least one computer system.

105. The method of claim 104 wherein the first information furnishing step comprises wireless transmissions involving the mobile communications device.

106. The method of claim 104 wherein the first information furnishing step is performed at least in part using push technology.

107. The method of claim 104 wherein the first information furnishing step is performed at least in part using pull technology.

108. The method of claim 104 wherein the first non-transient memory and the second non-transient memory are segregated.

109. The method of claim 104 wherein the first non-transient memory and the second non-transient memory have memory in common.

110. The method of claim 104 wherein:

the first non-transient memory includes electronic memory of a computer system on which the user has an account, and the second non-transient memory includes electronic memory of a computer system for managing airline travel;

the transaction category is a travel transaction;

the first information comprises an airline ticket; and the second information comprises information on use of the airline ticket by the user to obtain a boarding pass.

111. The method of claim 104 wherein:

the first non-transient memory includes electronic memory of a computer system on which the user has an account, and the second non-transient memory includes electronic memory of a computer system for managing airline travel;

the transaction category is a travel transaction;

the first information comprises a boarding pass; and the second information comprises information on use of the boarding pass by the user to board an airplane.

112. The method of claim 104 wherein:

the first non-transient memory includes electronic memory of a computer system on which the user has an account, and the second non-transient memory includes electronic memory of a computer system for managing reservations;

the transaction category is a travel transaction;

the first information comprises a reservation; and the second information comprises information on arrival of the user.

113. The method of claim 104 wherein:

the first non-transient memory includes electronic memory of a computer system on which the user has an account, and the second non-transient memory includes electronic memory of a computer system for managing reservations;

the transaction category is an entertainment transaction;

the first information comprises a reservation; and the second information comprises information on arrival of the user.

114. The method of claim 104 wherein:

the first non-transient memory includes electronic memory of a computer system on which the user has an account, and the second non-transient memory includes electronic memory of a computer system for managing events;

the transaction category is an entertainment transaction;

the first information comprises an event ticket; and the second information comprises information on use of the event ticket by the user.

115. The method of claim 104 wherein:

the first non-transient memory includes electronic memory of a computer system on which the user has an account, and the second non-transient memory includes electronic memory of a computer system for managing coupons;

the transaction category is a shopping transaction;

the first information comprises a store coupon; and the second information comprises information on use of the store coupon by the user.

116. The method of claim 104 wherein:

the first non-transient memory includes electronic memory of a computer system on which the user has an account, and the second non-transient memory includes electronic memory of a computer system for managing security;

the transaction category is a security pass transaction;

the first information comprises a security pass; and the second information comprises information on use of the security pass by the user.

117. The method of claim 104 wherein:

the first non-transient memory includes electronic memory of a computer system on which the user has an account, and the second non-transient memory includes electronic memory of a computer system for managing licenses;

the transaction category is a license transaction;

the first information comprises a driver's license; and the second information comprises information on use of the driver's license by the user.

118. The method of claim 104 wherein:

the first non-transient memory includes electronic memory of a computer system on which the user has an account, and the second non-transient memory includes electronic memory of a computer system for managing privileges;

the transaction category is a privileges transaction;

the first information comprises a rental privilege; and the second information comprises information on use of the rental privilege by the user.

119. A method of processing coupons comprising:

issuing electronic coupons from an agency;

furnish the electronic coupons to a delivery engine for storage in a database comprising diverse categories of information relating to a user of a mobile communications device;

furnishing at least one of the coupons in electronic bar code form to a mobile communications device for communication with light from the mobile communications device;

receiving, at the delivery engine, coupon usage data and a store identifier from a scan of light from the mobile communications device at a point-of-sale;

forwarding the coupon usage data and an identifier for the point-of-sale from the delivery engine to a clearinghouse;

preparing at the clearinghouse a report of coupon usage from the coupon usage data and the point-of-sale identifier;

sending money from the clearinghouse to the point-of-sale based on the coupon usage report; and sending the coupon usage report to the agency.

120. The method of claim 119 wherein the agency is a goods manufacturer.

121. The method of claim 119 wherein the agency is the point-of-sale.

122. A method of processing coupons comprising:

issuing electronic coupons from an agency;

furnish the electronic coupons to a mobile communications device for storage in a database thereof comprising diverse categories of information relating to a user of the mobile communications device, and for communication of at least one of the coupons in electronic bar code with light from the mobile communications device;

generating coupon usage data from a scan of light from the mobile communications device at a point-of-sale;

forwarding the coupon usage data and an identifier for the point-of-sale from the point-of-sale to a clearinghouse;

preparing at the clearinghouse a report of coupon usage from the coupon usage data and the point-of-sale identifier;

sending money from the clearinghouse to the point-of-sale based on the coupon usage report; and sending the coupon usage report to the agency.

123. The method of claim 122 wherein the agency is a goods manufacturer.

124. The method of claim 122 wherein the agency is the point-of-sale.

125. A mobile communications device comprising:

a wireless communications capability;

a user input capability; and a plurality of software components for communicating information in bar code form with light from the mobile communications device, the software components comprising:

a component for acquiring first information about diverse categories of information relating to a user of the mobile communications device;

a component for identifying at least one of the diverse information categories acquired by the acquiring component in response to the user input capability of the mobile communications device;

a component responsive to the identifying component for acquiring via the wireless communications capability second information from the identified information category; and a component for communicating the second information at least in part in bar code form with light from the mobile communications device.

126. The mobile communications device of claim 125 wherein the acquiring component comprises a component for acquiring the first information via the wireless communications capability.

127. The mobile communications device of claim 125 further comprising a memory, wherein the acquiring component comprises a component for acquiring the first information from the memory.

128. The mobile communications device of claim 125 further comprising:

an information display capability; and a component for displaying a view of the diverse information categories acquired by the acquiring component, by use of the information display capability.

129. The mobile communications device of claim 128 wherein the view comprises a plurality of top level folders.

130. The mobile communications device of claim 128 wherein the view comprises a plurality of subordinate level folders.

131. The mobile communications device of claim 128 wherein the view comprises a plurality of options.

132. The mobile communications device of claim 125 further comprising an information display capability, wherein:

the user input capability comprises a keypad or a stylus; and the information display capability comprises a display screen.

133. A mobile communications device comprising:

a communications capability;

a user input capability;

a memory; and a plurality of software components for managing a database of information in diverse categories relating to the user stored in the memory, and for communicating information in bar code form with light from the mobile communications device, the software components comprising:

a component for making available to the user first information about the diverse categories of information;

a component for identifying at least one of the diverse information categories with user input from the user input capability of the mobile communications device in response to the first information made available by the first information making available component;

a component for obtaining second information relating to the identified information category from the database; and a component for communicating the second information at least in part in bar code form with light from the mobile communications device.

134. The mobile communications device of claim 133 further comprising a wireless communications capability, wherein the second information obtaining component comprises a component for receiving the second information via the wireless communications capability.

135. The mobile communications device of claim 133 further comprising a wired communications capability, wherein the second information obtaining component comprises a component for receiving the second information via the wired communications capability.

136. The mobile communications device of claim 133 wherein the software components further comprise:

a component for receiving the second information from at least one remote information source; and a component for placing the second information received from the at least one remote information source into to the database.

137. The mobile communications device of claim 133 further comprising:

an information display capability; and a component for displaying the first information by use of the information display capability.

138. A system comprising:

a network comprising a wireless component;

a mobile communications device having a user input capability and a capability of communicating information in bar code form with light, and being coupled to the network via the wireless component thereof;

a bar code scanner coupled to the network;

a database maintained on at least one database server coupled to the network, the database comprising diverse transactional information in a plurality of transaction categories relating to a user of the mobile communications device;

means for furnishing information about at least some of the transaction categories from the database to the mobile communications device via the network;

means incorporated into the mobile communications device for identifying at least one of the transaction categories in response to the user input capability of the mobile communications device;

means for furnishing first information for the identified transaction category from the database to the mobile communications device via the network, the first information having a capability of enabling the mobile communications device to communicate at least part of the first information in bar code form with light from the mobile communications device;

means for receiving from the bar code scanner the part of the first information communicated in a bar code form with light; and means for process the part of the first information obtained in the receiving step to obtain second information about use of the first information by the user.

139. The system of claim 138 wherein the second information is stored in the database.

140. The system of claim 138 further comprising an additional database maintained on at least one additional database server coupled to the network, the second information being stored in the additional database.

141. The system of claim 140 wherein:

the server on which the database is maintained is part of a computer system on which the user has an account; and the additional server on which the additional database is maintained is part of a computer system for managing airline travel, for managing reservations, for managing events, for managing coupons, for managing security, for managing licenses, for managing privileges, or for managing any combination of the foregoing.

142. A system of processing coupons, comprising:

means for issuing electronic coupons from an agency;

means for furnishing the electronic coupons to a delivery engine for storage in a database comprising diverse categories of information relating to a user of a mobile communications device;

means for furnishing the coupons in electronic bar code form to a mobile communications device for communication thereof with light from the mobile communications device;

means for receiving, at the delivery engine, coupon usage data and a point-of-sale identifier from a scan of light from the mobile communications device at a point-of-sale, the light communicating at least one of the coupons in bar code form;

means for forwarding the coupon data and the point-of-sale identifier from the delivery engine to a clearinghouse;

means for preparing at the clearinghouse a report of coupon usage from the coupon usage data and the point-of-sale identifier;

means for sending money from the clearinghouse to the point-of-sale based on the coupon usage report; and means for sending the coupon usage report to the agency.

143. The system of claim 142 wherein the agency is a goods manufacturer.

144. The system of claim 142 wherein the agency is the point-of-sale.

145. A system of processing coupons, comprising:

means for issuing electronic coupons from an agency;

means for furnishing the electronic coupons to a mobile communications device for storage in a database thereon comprising diverse categories of information relating to a user of the mobile communications device, and for communication the electronic coupons in electronic bar code form with light from the mobile communications device;

means for generating coupon usage data from a scan of light from the mobile communications device at a point-of-sale, the light communicating at least one of the coupons in bar code form;

means for forwarding the coupon data and the point-of-sale identifier to a clearinghouse;

means for preparing at the clearinghouse a report of coupon usage from the coupon usage data and the point-of-sale identifier;

means for sending money from the clearinghouse to the point-of-sale based on the coupon usage report; and means for sending the coupon usage report to the agency.

146. The system of claim 145 wherein the agency is a goods manufacturer.

147. The system of claim 145 wherein the agency is the point-of-sale.

* * * * *